US012687799B2

(12) United States Patent
Uno et al.

(10) Patent No.: US 12,687,799 B2
(45) Date of Patent: Jul. 21, 2026

(54) PROCESS CARTRIDGE

(71) Applicant: CANON KABUSHIKI KAISHA, Tokyo (JP)

(72) Inventors: Masashi Uno, Shizuoka (JP); Shohei Kototani, Shizuoka (JP); Dai Nozaki, Shizuoka (JP); Kenji Ookubo, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/959,326

(22) Filed: Nov. 25, 2024

(65) Prior Publication Data

US 2025/0181010 A1 Jun. 5, 2025

(30) Foreign Application Priority Data

Dec. 1, 2023 (JP) ................................ 2023-203617

(51) Int. Cl.
*G03G 15/08* (2006.01)
*G03G 9/097* (2006.01)
*G03G 21/18* (2006.01)

(52) U.S. Cl.
CPC ..... *G03G 15/0818* (2013.01); *G03G 9/09725* (2013.01); *G03G 21/1814* (2013.01)

(58) Field of Classification Search
CPC ........... G03G 15/0818; G03G 9/09725; G03G 21/1814; G03G 15/08; G03G 9/08
See application file for complete search history.

(56) References Cited

U.S. PATENT DOCUMENTS

2013/0078006 A1* 3/2013 Kawashima ....... G03G 15/0818 399/286
2020/0292956 A1* 9/2020 Amano .............. G03G 9/09725
2025/0181002 A1* 6/2025 Ookubo ............. G03G 9/09725
2025/0181003 A1* 6/2025 Nozaki .............. G03G 9/09725
2025/0181004 A1* 6/2025 Kototani ............ G03G 9/09725
2025/0298331 A1* 9/2025 Terada ................ G03G 9/0827

FOREIGN PATENT DOCUMENTS

JP 2003302827 A 10/2003
JP 2013076996 A 4/2013
JP 2016065963 A 4/2016
JP 2017083775 A 5/2017

* cited by examiner

*Primary Examiner* — Sandra Brase
(74) *Attorney, Agent, or Firm* — Canon U.S.A., Inc. IP Division

(57) ABSTRACT

A process cartridge includes a toner and a developing roller. In the toner, a cohesion cluster containing fine silica particles and a binder component is present on surfaces of toner particles. Ratios of toner particles having the cohesion cluster before and after treatments with ultrasonic waves under specific conditions in terms of number % are within predetermined ranges. The developing roller has an Asker C hardness of 56 degrees or more and 75 degrees or less.

5 Claims, 6 Drawing Sheets

PROCESS CARTRIDGE

BACKGROUND

Technical Field

The present disclosure relates to a process cartridge used in an image forming method such as electrophotography.

Description of the Related Art

In recent years, main bodies and process cartridges of electrophotographic image-forming apparatuses such as printers and copying machines have been required to have even higher speed and longer lifetime. As the speed of an apparatus increases, the rotation speeds of electrophotographic members such as a developing roller and a photosensitive member used in the electrophotographic process also increase; therefore, a toner is subjected to a stronger rubbing load from these electrophotographic members. In addition, as the lifetime of the apparatus extends, the number of times the toner is subjected to rubbing increases. Thus, with the realization of higher speed and longer lifetime, the toner is subjected to a rubbing load more strongly and more frequently, resulting in acceleration of deterioration of the toner.

An adverse effect in an image associated with toner deterioration is a disadvantage of so-called "fogging" in which a toner adheres to a non-image portion. When a toner is repeatedly subjected to a rubbing load, an external additive of the toner is embedded in toner particles or moves to an electrophotographic member, which is a rubbing counterpart. Thus, the amount of external additive present on the surfaces of the toner particles decreases gradually. A decrease in the amount of external additive causes a decrease in chargeability of the toner, and the amounts of toner having an amount of electrical charge of zero and toner having a charge of opposite-polarity increase, resulting in the worsening of fogging. High-speed, long-lifetime electrophotographic image-forming apparatuses have a disadvantage in that deterioration of a toner is accelerated, and thus fogging is also likely to worsen.

For such a disadvantage of toner deterioration, for example, Japanese Patent Laid-Open No. 2013-76996 discloses that high chargeability and endurance of a toner can be reliably achieved by strongly bonding a shell to the surface of the toner to prevent separation of the shell.

Japanese Patent Laid-Open No. 2016-65963 discloses that a silica aggregate is mixed with a toner, and the aggregate is gradually disintegrated in a developing device and is thereby supplied as an external additive to the toner.

However, due to a severer rubbing load associated with the realization of higher speed and longer lifetime of electrophotographic image-forming apparatuses, even in the toner designed so as to prevent the separation of the shell, as disclosed in Japanese Patent Laid-Open No. 2013-76996, it is difficult to completely prevent the separation, and fogging may gradually worsen through the lifetime of a process cartridge. In addition, even in the toner designed so as to gradually disintegrate an aggregate, as disclosed in Japanese Patent Laid-Open No. 2016-65963, disintegration progresses more than expected due to a severer rubbing load, the aggregate is consumed, the effect of the aggregate is lost in the latter half of the lifetime of a process cartridge, resulting in worsening of fogging. If the amount of aggregate is increased in order to prevent this, there is a concern about an adverse effect of so-called "development stripe" in which the excessive aggregate adheres to a developing roller, a developing blade, and the like, and the adhering substance generates a streak-like density variation on a toner coat on the developing roller.

SUMMARY

In view of the above disadvantages, the present disclosure provides a process cartridge capable of suppressing the occurrence of fogging and the generation of development stripes through the process cartridge lifetime and capable of forming an image with high image quality even in a high-speed, long-lifetime electrophotographic image-forming apparatus.

To address the above disadvantages, the present inventors have conducted extensive studies. As a result, it has been found that the above disadvantages can be addressed by the following configurations.

Specifically, the present disclosure provides a process cartridge detachably attachable to an electrophotographic apparatus main body, the process cartridge including a toner and a developing roller.

(I) The toner includes toner particles, and a cohesion cluster containing fine silica particles and a binder component is present on surfaces of the toner particles, an arithmetic mean value Ag of a Feret diameter of the cohesion cluster is 500 nm or more and 8,000 nm or less, when a number percentage of toner particles having the cohesion cluster is represented by CI (number %), CI is 1 number % or more and 15 number % or less, and when a number percentage of toner particles having the cohesion cluster in the toner after being treated under an ultrasonic wave condition A is represented by Ca (number %), and a number percentage of toner particles having the cohesion cluster in the toner after being treated under an ultrasonic wave condition B is represented by Cb (number %), CI, Ca, and Cb satisfy formulae (1) and (2), ultrasonic wave condition A: output frequency 30 kHz, output capacity 0.75 W, and irradiation time 300 s ultrasonic wave condition B: output frequency 30 kHz, output capacity 30 W, and irradiation time 300 s $$0.90 \leq Ca/CI \leq 1.00 \quad \text{Formula (1)}$$

$$0.05 \leq Cb/CI \leq 0.25. \quad \text{Formula (2)}$$

(II) The developing roller includes a conductive shaft member and at least one elastic layer on the conductive shaft member, and the developing roller has an Asker C hardness of 56 degrees or more and 75 degrees or less.

Further features of the present disclosure will become apparent from the following description of exemplary embodiments with reference to the attached drawings.

DESCRIPTION OF THE EMBODIMENTS

Figure 1A:
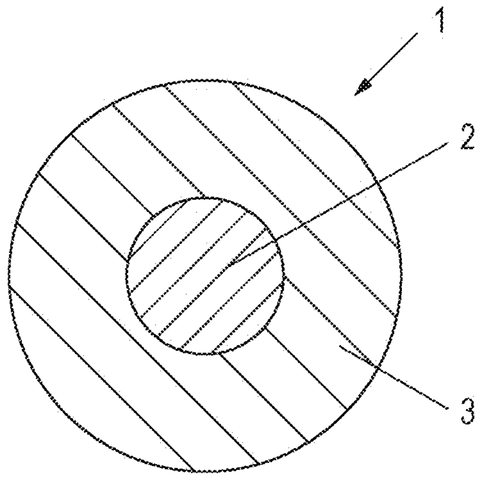
FIGS. 1A and 1B are each a schematic sectional view of a developing roller used in a process cartridge according to the present disclosure.

Hereinafter, the present disclosure will be described in detail. The present disclosure is not limited to the descriptions below.

In the present disclosure, the expression "XX or more and YY or less" or "XX to YY" indicating a numerical range means a numerical range including the lower limit and the upper limit, which are end points, unless otherwise specified. In the following descriptions, a toner particle before a cohesion cluster is present on the surface of the toner particle may be referred to as a "toner core particle".

FEATURES OF THE DISCLOSURE

The present disclosure provides a process cartridge detachably attachable to an electrophotographic apparatus main body, the process cartridge at least including a toner and a developing roller.

(I) The toner at least includes toner particles, and a cohesion cluster containing fine silica particles and a binder component is present on surfaces of the toner particles, an arithmetic mean value Ag of a Feret diameter of the cohesion cluster is 500 nm or more and 8,000 nm or less, when a number percentage of toner particles having the cohesion cluster is represented by CI (number %), CI is 1 number % or more and 15 number % or less, and when a number percentage of toner particles having the cohesion cluster in the toner after being treated under an ultrasonic wave condition A below is represented by Ca (number %), and a number percentage of toner particles having the cohesion cluster in the toner after being treated under an ultrasonic wave condition B below is represented by Cb (number %), CI, Ca, and Cb satisfy formulae (1) and (2).

Ultrasonic wave condition A: output frequency 30 kHz, output capacity 0.75 W, and irradiation time 300 s Ultrasonic wave condition B: output frequency 30 kHz, output capacity 30 W, and irradiation time 300 s $$0.90 \le Ca/CI \le 1.00 \quad \text{Formula (1)}$$

$$0.05 \le Cb/CI \le 0.25 \quad \text{Formula (2)}$$

(II) The developing roller includes a conductive shaft member and at least one elastic layer on the conductive shaft member, and the developing roller has an Asker C hardness of 56 degrees or more and 75 degrees or less.

The present inventors have found that, with the above configuration, the occurrence of fogging and the generation of development stripes are suppressed throughout the lifetime and an image with high image quality can be formed even in a high-speed, long-lifetime electrophotographic image-forming apparatus. Details of the reasons for this are not clear but are presumably as follows.

First, it is considered that when CI is 1 number % or more and 15 number % or less, the disadvantage of development stripes caused by adhesion of excessive cohesion clusters to a developing roller, a developing blade, and the like can be prevented.

Furthermore, in addition to the value of CI, the amount of presence after treatment under the ultrasonic wave condition A is represented by Ca, the amount of presence after treatment under the ultrasonic wave condition B is represented by Cb, and the ease of disintegration of the cohesion clusters is defined by these three values. Presumably, there are two main types of rubbing load that the toner is subjected in a process cartridge container. The first is a weak rubbing load due to a toner stirring mechanism provided in the container. The second is a strong rubbing load caused by rubbing against various electrophotographic members such as a developing roller, a toner supplying roller, a developing blade, and a photosensitive member.

Ca is an indicator indicating the ease of disintegration under the weak rubbing load, and Cb is an indicator indicating the ease of disintegration under the strong rubbing load. Presumably, in a high-speed, long-lifetime electrophotographic apparatus, in order to suppress the occurrence of fogging throughout the lifetime of the apparatus, it is necessary that cohesion clusters be continuously disintegrated throughout the lifetime, and the amount of external additive decreased by toner deterioration be compensated for. To achieve such a state, the present inventors have conducted extensive studies. As a result, the following direction has been found.

(i) By controlling the value of Ca/CI within the range of formula (1), cohesion cluster are designed to be hardly disintegrated by the weak rubbing load caused by a toner stirring mechanism.

(ii) By controlling the value of Cb/CI within the range of formula (2), a certain amount of cohesion clusters are disintegrated by the strong rubbing load caused by rubbing against various electrophotographic members.

It has been found that the occurrence of fogging can be suppressed to a certain extent throughout the lifetime by satisfying (i) and (ii) above. However, this alone is not sufficiently effective, and fogging may occur in some cases at the end of the lifetime. In view of this, the present inventors have further conducted studies and found that the occurrence of fogging is specifically suppressed when a condition (iii) below is further satisfied in addition to (i) and (ii).

(iii) The developing roller has an Asker C hardness of 56 degrees or more and 75 degrees or less.

Regarding the phenomenon that the occurrence of fogging is specifically suppressed when the above condition (iii) is satisfied, the present inventors presume as follows.

In a process cartridge container, a toner is supplied onto a developing roller by a toner supplying roller. The toner on the developing roller is controlled by a developing blade and formed into a toner coat layer having a certain thickness and conveyed to a portion in contact with a photosensitive member. In the portion in contact with the photosensitive member, a latent image that has been formed on the photosensitive member in advance is developed by the toner. After the development, the toner remaining on the developing roller without moving onto the photosensitive member is scraped off from the developing roller at a portion in contact with the toner supplying roller. In the toner according to the present disclosure, the cohesion clusters on the surfaces of toner particles are gradually disintegrated by rubbing against various electrophotographic members such as the developing roller, the toner supplying roller, the developing blade, and the photosensitive member. Of the generated disintegrated product, part of the disintegrated product remaining on the developing roller without moving onto the photosensitive member is scraped off from the developing roller together with the toner at a portion in contact with the toner supplying roller. This scraped disintegrated product is supplied to the toner and compensates for a decrease in the amount of external additive caused by toner deterioration to thereby suppress the occurrence of fogging.

Presumably, however, if the Asker C hardness of the developing roller is excessively low, adhesion of the disintegrated product to the developing roller increases, the disintegrated product is less likely to be scraped off at the portion in contact with the toner supplying roller, and therefore, the effect of suppressing the occurrence of fogging is not sufficiently exerted. Conversely, if the Asker C hardness of the developing roller is excessively high, although adhesion of the disintegrated product to the developing roller decreases, the rate of toner deterioration increases. It is considered that, accordingly, the rate of decrease in the amount of external additive due to toner deterioration exceeds the rate of supply of the disintegrated product in some cases, and fogging may occur. Presumably, from these reasons, in the case where the Asker C hardness of the developing roller is 56 degrees or more and 75 degrees or less, adhesion of the disintegrated product to the developing roller is low, and the rate of toner deterioration can be reduced, thus specifically suppressing the occurrence of fogging.

Embodiments related to a process cartridge according to the present disclosure will be described below. Note that embodiments are not limited to the contents below.

Toner

Components constituting a toner and methods for producing a toner will be described below.

A toner according to the present disclosure at least includes toner particles, in which a cohesion cluster containing fine silica particles and a binder component is present on surfaces of the toner particles,

- an arithmetic mean value Ag of a Feret diameter of the cohesion cluster is 500 nm or more and 8,000 nm or less,
- when a number percentage of toner particles having the cohesion cluster is represented by CI (number %), CI is 1 number % or more and 15 number % or less, and
- when a number percentage of toner particles having the cohesion cluster in the toner after being treated under an ultrasonic wave condition A below is represented by Ca (number %), and a number percentage of toner particles having the cohesion cluster in the toner after being treated under an ultrasonic wave condition B below is represented by Cb (number %), CI, Ca, and Cb satisfy formulae (1) and (2).
- Ultrasonic wave condition A: output frequency 30 kHz, output capacity 0.75 W, and irradiation time 300 s
- Ultrasonic wave condition B: output frequency 30 kHz, output capacity 30 W, and irradiation time 300 s $$0.90 \leq Ca/CI \leq 1.00 \quad \text{Formula (1)}$$

$$0.05 \leq Cb/CI \leq 0.25 \quad \text{Formula (2)}$$

Cohesion Cluster and Toner Particle

Figure 4:
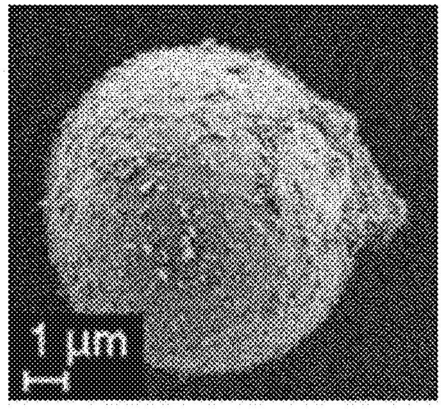
FIG. 4 is a representative drawing of a toner having a cohesion cluster according to the present disclosure.

FIG. 4 is a representative drawing of a toner in which a cohesion cluster is present on the surface of a toner particle.

The cohesion cluster containing fine silica particles and a binder component may specifically include particles containing silica as a main component and a binder component capable of binding the particles together.

Examples of the particles containing silica as a main component include dry-process fine silica particles produced by vapor-phase oxidation of a silicon halide, so-called dry-process or fumed silica, and so-called wet-process fine silica particles produced from water glass or the like. These particles may be subjected to hydrophobization treatment. Examples of a treatment agent used for the hydrophobization treatment include silicone varnishes, modified silicone varnishes, silicone oils, modified silicone oils, silane compounds, silane coupling agents, other organosilicon compounds, and organotitanium compounds. These may be used alone or in combination of two or more thereof.

Primary particles of the fine silica particles preferably have a number-average particle diameter of 10 nm or more and 200 nm or less (more preferably 15 nm or more and 150 nm or less). The number-average particle diameter of primary particles of the fine silica particles may be determined using an enlarged photograph of the toner taken with a scanning electron microscope.

The binder component capable of binding together the particles containing silica as a main component is required to be able to stick the particles with appropriate strength and not to cause any adverse effects even when subjected to mechanical stress or environmental changes such as temperature and humidity in the developing process. Examples of such a material include organic resins. In particular, vinyl resins and polyester resins can be suitably used. These resins can hold particles containing silica as a main component with appropriate sticking strength and enable the particles containing silica as a main component to be continuously supplied into the developing process as the toner is used. The binder component itself is also supplied into the developing process at the same time, and appropriate selection of the hardness of the binder component and responsiveness of the binder component to environmental changes such as temperature and humidity can reduce soiling of members and changes in developing characteristics. Specific materials will be described in the section of a production method described later.

In the toner according to the present disclosure, when a number percentage of toner particles having the cohesion cluster is represented by CI (number %), CI is 1 number % or more and 15 number % or less. If CI is excessively low, the effect of suppressing the occurrence of fogging may be insufficiently exerted because the number of toner particles including a cohesion cluster is excessively small. If CI is excessively high, excessive cohesion clusters adhere to the developing roller, the developing blade, and the like, and development stripes may be thereby generated in some cases. The value of CI is preferably 2 number % or more and 14 number % or less, more preferably 3 number % or more and 12 number % or less.

Furthermore, in the toner according to the present disclosure, when a number percentage of toner particles having the cohesion cluster in the toner after being treated under an ultrasonic wave condition A below is represented by Ca (number %), and a number percentage of toner particles having the cohesion cluster in the toner after being treated under an ultrasonic wave condition B below is represented by Cb (number %), CI, Ca, and Cb satisfy formulae (1) and (2).

Ultrasonic wave condition A: output frequency 30 kHz, output capacity 0.75 W, and irradiation time 300 s Ultrasonic wave condition B: output frequency 30 kHz, output capacity 30 W, and irradiation time 300 s $$0.90 \leq Ca/CI \leq 1.00 \quad \text{Formula (1)}$$

$$0.05 \leq Cb/CI \leq 0.25 \quad \text{Formula (2)}$$

More specifically, the range of Ca/CI needs to be 0.90 or more and 1.00 or less, and a Ca/CI smaller than 0.90 means that cohesion clusters are likely to be disintegrated even by weak rubbing with a toner stirring mechanism provided in a container. Therefore, cohesion clusters are rapidly consumed, the effect does not last long, and fogging may occur in the latter half of the lifetime. A preferred range of Ca/CI is 0.95 or more and 1.00 or less.

The range of Cb/CI needs to be 0.05 or more and 0.25 or less. If Cb/CI is larger than 0.25, cohesion cluster are less likely to be disintegrated even being subjected to a strong rubbing load due to rubbing against various electrophotographic members, and the effects of the present disclosure are unlikely to be achieved. A preferred range of Cb/CI is 0.05 or more and 0.15 or less.

Furthermore, an arithmetic mean value Ag of a Feret diameter of the cohesion cluster is 500 nm or more and 8,000 nm or less. If Ag is less than 500 nm, the consumption rate of cohesion clusters is increased, the effect does not last long, and fogging may occur in the latter half of the lifetime. If Ag is more than 8,000 nm, development stripes due to adhesion of cohesion clusters to the developing roller and the developing blade are likely to be generated. The value of Ag is preferably 1,000 nm or more and 4,000 nm or less.

Furthermore, on a surface of a toner having the cohesion cluster observed with a scanning electron microscope, an area fraction of the binder component of the cohesion cluster is preferably 5% or more and 50% or less relative to the entirety of the cohesion cluster. As described above, when cohesion clusters appropriately contain the binder component, the move of the cohesion clusters is appropriately controlled, and the effects of the present disclosure are achieved at a high level. If the area fraction is smaller than this range, cohesion clusters are likely to move, and development stripes due to adhesion of cohesion clusters to the developing roller and the developing blade are likely to be generated. If the area fraction is larger than this range, cohesion clusters are unlikely to move, and the effect of suppressing fogging is unlikely to be achieved.

Furthermore, the toner preferably includes, among toner particles having the cohesion cluster, toner particles having a cohesion cluster satisfying (a) below in an amount of 50 number % or more, more preferably 60 number % or more, still more preferably 80 number % or more.

(a) In a binarized image of a backscattered electron image of a cohesion cluster taken with a scanning electron microscope, when the midpoint of the image of the cohesion cluster is defined as a reference point, and a total of 18 straight lines are drawn at intervals of 10° so as to pass through the reference point, the number A of straight lines having a line segment with a length of a continuous dark portion of 100 nm or more on the straight lines is 12 or more relative to the total of 18 straight lines.

Satisfying (a) above means that resin particles are uniformly contained in the cohesion cluster. When resin particles are evenly contained in the cohesion cluster, an imbalance does not occur in the configuration of the cohesion cluster. Thus, an imbalance also does not occur when the cohesion cluster moves from a toner particle, and the effects of the present disclosure are likely to be achieved.

The toner particles contain a binder resin. The content of the binder resin is preferably 50% by mass or more relative to the total amount of resin components in the toner particles.

Examples of the binder resin include, but are not particularly limited to, styrene acrylic resins, epoxy resins, polyester resins, polyurethane resins, polyamide resins, cellulose resins, polyether resins, and resin mixtures and composite resins of the foregoing. From the viewpoint of low cost, availability, and good low-temperature fixability, a styrene acrylic resin and a polyester resin are preferred.

Examples of the styrene acrylic resin include polymers obtained from monofunctional polymerizable monomers or polyfunctional polymerizable monomers below, copolymers obtained by combining two or more of these, and mixtures thereof.

Examples of the monofunctional polymerizable monomers include: styrene derivatives such as styrene, α-methylstyrene, β-methylstyrene, o-methylstyrene, m-methylstyrene, p-methylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene, and p-phenylstyrene; acrylic polymerizable monomers such as methyl acrylate, ethyl acrylate, n-propyl acrylate, iso-propyl acrylate, n-butyl acrylate, iso-butyl acrylate, tert-butyl acrylate, n-amyl acrylate, n-hexyl acrylate, 2-ethylhexyl acrylate, n-octyl acrylate, n-nonyl acrylate, cyclohexyl acrylate, benzyl acrylate, dimethyl phosphate ethyl acrylate, diethyl phosphate ethyl acrylate, dibutyl phosphate ethyl acrylate, and 2-benzoyloxyethyl acrylate; methacrylic polymerizable monomers such as methyl methacrylate, ethyl methacrylate, n-propyl methacrylate, iso-propyl methacrylate, n-butyl methacrylate, iso-butyl methacrylate, tert-butyl methacrylate, n-amyl methacrylate, n-hexyl methacrylate, 2-ethylhexyl methacrylate, n-octyl methacrylate, n-nonyl methacrylate, diethyl phosphate ethyl methacrylate, and dibutyl phosphate ethyl methacrylate; methylene aliphatic monocarboxylic acid esters; vinyl esters such as vinyl acetate, vinyl propionate, vinyl butyrate, vinyl benzoate, and vinyl formate; vinyl ethers such as vinyl methyl ether, vinyl ethyl ether, and vinyl isobutyl ether; and vinyl ketones such as vinyl methyl ketone, vinyl hexyl ketone, and vinyl isopropyl ketone.

Examples of the polyfunctional polymerizable monomers include: diethylene glycol diacrylate, triethylene glycol diacrylate, tetraethylene glycol diacrylate, polyethylene glycol diacrylate, 1,6-hexanediol diacrylate, neopentyl glycol diacrylate, tripropylene glycol diacrylate, polypropylene glycol diacrylate, 2,2'-bis(4-(acryloxy·diethoxy)phenyl) propane, trimethylolpropane triacrylate, tetramethylolmethane tetraacrylate, ethylene glycol dimethacrylate, diethylene glycol dimethacrylate, triethylene glycol dimethacrylate, tetraethylene glycol dimethacrylate, polyethylene glycol dimethacrylate, 1,3-butylene glycol dimethacrylate, 1,6-hexanediol dimethacrylate, neopentyl glycol dimethacrylate, polypropylene glycol dimethacrylate, 2,2'-bis(4-(methacryloxy·diethoxy)phenyl) propane, 2,2'-bis(4-(methacryloxy·polyethoxy)phenyl) propane, trimethylolpropane trimethacrylate, tetramethylolmethane tetramethacrylate, divinylbenzene, divinylnaphthalene, and divinyl ether.

The polyester resin that can be used may be a product prepared by condensation polymerization of a carboxylic acid component and an alcohol component described below. Examples of the carboxylic acid component include terephthalic acid, isophthalic acid, phthalic acid, fumaric acid, maleic acid, cyclohexanedicarboxylic acid, and trimellitic acid. Examples of the alcohol component include bisphenol A, hydrogenated bisphenol, bisphenol A-ethylene oxide adduct, bisphenol A-propylene oxide adduct, glycerin, trimethylolpropane, and pentaerythritol.

The polyester resin may be a polyester resin containing a urea group. In the polyester resin, carboxy groups located at terminals or the like may not be capped.

The toner particles may contain a coloring agent. The coloring agent may be a known pigment or dye. The coloring agent can be a pigment from the viewpoint of good weatherability.

Examples of cyan coloring agents include copper phthalocyanine compounds and derivatives thereof, anthraquinone compounds, and basic dye lake compounds.

Specific examples thereof include C.I. Pigment Blue 1, 7, 15, 15:1, 15:2, 15:3, 15:4, 60, 62, and 66.

Examples of magenta coloring agents include condensed azo compounds, diketopyrrolopyrrole compounds, anthraquinone compounds, quinacridone compounds, basic dye lake compounds, naphthol compounds, benzimidazolone compounds, thioindigo compounds, and perylene compounds.

Specific examples thereof include C.I. Pigment Red 2, 3, 5, 6, 7, 23, 48:2, 48:3, 48:4, 57:1, 81:1, 122, 144, 146, 150, 166, 169, 177, 184, 185, 202, 206, 220, 221, and 254 and C.I. Pigment Violet 19.

Examples of yellow coloring agents include condensed azo compounds, isoindolinone compounds, anthraquinone compounds, azo metal complexes, methine compounds, and allylamide compounds.

Specific examples thereof include C.I. Pigment Yellow 12, 13, 14, 15, 17, 62, 74, 83, 93, 94, 95, 97, 109, 110, 111, 120, 127, 128, 129, 147, 151, 154, 155, 168, 174, 175, 176, 180, 181, 185, 191, and 194.

Examples of black coloring agents include carbon black and coloring agents adjusted to black by using the above-described yellow coloring agents, magenta coloring agents, and cyan coloring agents.

These coloring agents may be used alone or as a mixture. Furthermore, these may be used in a solid solution state.

The coloring agent is preferably used in an amount of 1.0 part by mass or more and 20.0 parts by mass or less relative to 100.0 parts by mass of the binder resin.

The toner may be a magnetic toner containing a magnetic material.

In this case, the magnetic material can also function as a coloring agent.

Examples of the magnetic material include iron oxides such as magnetite, hematite, and ferrite; metals such as iron, cobalt, and nickel, alloys of any of these metals and a metal such as aluminum, cobalt, copper, lead, magnesium, tin, zinc, antimony, beryllium, bismuth, cadmium, calcium, manganese, selenium, titanium, tungsten, or vanadium, and mixtures thereof.

The toner particles may contain a release agent. The release agent is not particularly limited and may be a known wax.

Specific examples thereof include petroleum waxes such as paraffin wax, microcrystalline wax, and petrolatum and derivatives thereof; montan waxes and derivatives thereof; hydrocarbon waxes obtained by the Fischer-Tropsch process and derivatives thereof; polyolefin waxes such as polyethylene and derivatives thereof; and natural waxes such as carnauba wax and candelilla wax and derivatives thereof.

The derivatives also include oxides, block copolymers with vinyl monomers, and graft modified products.

Examples of waxes further include alcohols such as higher aliphatic alcohols; fatty acids such as stearic acid and palmitic acid, and acid amides, esters, and ketones thereof; hydrogenated castor oil and derivatives thereof, vegetable waxes, and animal waxes. These may be used alone or in combination.

In particular, when a polyolefin, a hydrocarbon wax obtained by the Fischer-Tropsch process, or a petroleum wax is used, developability and transferability tend to be improved.

An antioxidant may be added to the waxes as long as the above-described effects are not affected.

The content of the release agent is preferably 1.0 part by mass or more and 30.0 parts mass or less relative to 100.0 parts by mass of the binder resin or the polymerizable monomer that forms the binder resin.

The melting point of the release agent is preferably 30° C. or higher and 120° C. or lower, more preferably 60° C. or higher and 100° C. or lower.

The use of a release agent that exhibits the above thermal characteristics efficiently exhibits the release effect and ensures a wider fixing region.

External Additives

An organic or inorganic fine powder can be externally added to the toner particles as necessary as long as the effects of the present disclosure are not impaired. The particle diameter of the organic or inorganic fine powder is preferably 1/10 or less of the weight-average particle diameter of the toner particles in view of durability when the fine powder is added to the toner particles.

Examples of the Organic or Inorganic Fine Powder Include:

(1) flowability imparting agents: silica, alumina, titanium oxide, carbon black, and fluorocarbon,
(2) abrasives: metal oxides (for example, strontium titanate, cerium oxide, alumina, magnesium oxide, and chromium oxide), nitrides (for example, silicon nitride), carbides (for example, silicon carbide), and metal salts (for example, calcium sulfate, barium sulfate, and calcium carbonate),
(3) lubricants: fluoropolymer powders (for example, vinylidene fluoride and polytetrafluoroethylene) and fatty acid metal salts (for example, zinc stearate and calcium stearate), and
(4) charge control particles: metal oxides (for example, tin oxide, titanium oxide, zinc oxide, silica, and alumina), carbon black, and hydrotalcite.

The surface of the organic or inorganic fine powder may be subjected to a hydrophobization treatment to improve the flowability of the toner and uniformize the charging of the toner particles. Examples of treatment agents for the hydrophobization treatment of the organic or inorganic fine powder include unmodified silicone varnishes, modified silicone varnishes, unmodified silicone oils, modified silicone oils, silane compounds, silane coupling agents, other organosilicon compounds, and organotitanium compounds. These treatment agents may be used alone or in combination.

In particular, hydrotalcite, which is a layer composite compound, can be contained as an external additive. Incorporation of hydrotalcite, which has chargeability of opposite polarity to silica serving as a main component constituting cohesion clusters, improves chargeability of the toner, more specifically, a charge rising property in a high-temperature, high-humidity environment that is harsh on the charge rising property. Furthermore, hydrotalcite can be subjected to a fluorine treatment. Presumably, when hydrotalcite contains fluorine, which has high electronegativity, the exchange of charges is further promoted, and higher effects are achieved.

Method for Producing Toner

An example of a method for producing the toner particles described above will be described below, but the method is not limited to the following.

The method for producing toner particles is not particularly limited, and, for example, a suspension polymerization method, a dissolution suspension method, an emulsion aggregation method, or a pulverization method can be employed. For example, a method for producing toner particles by the emulsion aggregation method is described below.

Method for Producing Toner Particles (Toner Core Particles) by Emulsion Aggregation Method Step of Preparing Fine Resin Particle Dispersion Liquid A fine resin particle dispersion liquid can be prepared by a known method, but the method is not limited thereto. For example, the method may be an emulsion polymerization method, a self-emulsification method, a phase-inversion emulsification method of emulsifying a resin by adding an aqueous medium to a solution of the resin dissolved in an organic solvent, or a forced emulsification method of forcibly emulsifying a resin by a treatment in an aqueous medium at a high temperature without using an organic solvent.

As one example, a method for preparing a fine resin particle dispersion liquid by the phase-inversion emulsification method will be described below.

A resin component is dissolved in an organic solvent in which the resin component is soluble, and a surfactant and a basic compound is added to the solution. In this case, if the resin component is a crystalline resin having a melting point, the resin component may be dissolved by heating to the melting point or higher. Subsequently, while stirring is performed with a homogenizer or the like, an aqueous medium is gradually added to the solution to precipitate fine resin particles. Subsequently, the solvent is removed by heating or reducing the pressure to prepare an aqueous dispersion liquid of the fine resin particles.

Here, the organic solvent used for dissolving the resin component may be any organic solvent than can dissolve the resin component. Specifically, examples thereof include toluene and xylene.

Examples of the surfactant used in the preparation step include anionic surfactants such as sulfates, sulfonates, carboxylates, phosphates, and soaps; cationic surfactants such as amine salts and quaternary ammonium salts; and nonionic surfactants such as polyethylene glycol, alkylphenol ethylene oxide adducts, and polyhydric alcohols.

Examples of the basic compound used in the preparation step include inorganic bases such as sodium hydroxide and potassium hydroxide, and organic bases such as ammonia, triethylamine, trimethylamine, dimethylaminoethanol, and diethylaminoethanol. The basic compounds may be used alone or in combination of two or more thereof.

Preparation of Coloring Agent Dispersion Liquid

A coloring agent dispersion liquid can be prepared using a known dispersion method. For example, a typical dispersion device such as a homogenizer, a ball mill, a colloid mill, or an ultrasonic disperser can be used, and the method is not limited. A surfactant used during dispersion may be the surfactant described above.

Preparation of Wax Dispersion Liquid

In the preparation of a wax dispersion liquid, a wax is dispersed in water together with a surfactant, a basic compound, and the like, the resulting liquid is then heated to a temperature equal to or higher than the melting point of the wax and subjected to a dispersion treatment using a homogenizer or a disperser configured to apply a strong shear force. Through this process, a wax dispersion liquid is prepared. The surfactant used during dispersion may be the surfactant described above. The basic compound used during dispersion may be the basic compound described above.

Aggregate Particle Forming Step

In an aggregate particle forming step, first, the fine resin particle dispersion liquid, the coloring agent dispersion liquid, the wax dispersion liquid, etc. are mixed to prepare a liquid mixture. Subsequently, while heating is performed at a temperature equal to or lower than the melting point of the fine resin particles, the pH is made acidic to cause aggregation, thereby forming aggregate particles including fine resin particles, coloring agent particles, and release agent particles. Thus, an aggregate particle dispersion liquid is prepared.

First Fusion Step

In a first fusion step, the pH of the aggregate particle dispersion liquid is increased under stirring conditions according to the aggregate particle forming step to stop the progress of aggregation, and heating is performed at a temperature equal to or higher than the melting point of the resin component to prepare a fused particle dispersion liquid. Fine amorphous resin particle attachment step In a fine amorphous resin particle attachment step, a fine amorphous resin particle dispersion liquid is added to the fused particle dispersion liquid, and the pH is decreased to attach amorphous resin particles to the surfaces of fused particles. Thus, a dispersion liquid of resin-attached particles is prepared. Here, this cover layer corresponds to a shell layer formed through a shell layer forming step described later. Note that the fine amorphous resin particle dispersion liquid can be produced in accordance with the above-described step of preparing the fine resin particle dispersion liquid.

Second Fusion Step

In a second fusion step, the pH of the resin-attached particle dispersion liquid is increased according to the first fusion step to stop the progress of aggregation, and heating is performed at a temperature equal to or higher than the melting point of the resin component to fuse resin-attached aggregate particles, thus preparing a toner core particle dispersion liquid in which toner core particles having a shell layer are dispersed.

Method for Producing Toner Particles Having Cohesion Cluster

As a method for producing toner particles having a cohesion cluster that contains fine silica particles and a binder component, external addition may be performed on the toner core particles by a wet method from the viewpoint of uniformly aggregating fine silica particles and the binder component. When toner particles having a cohesion cluster that contains fine silica particles and a binder component are produced by a wet method, the method may include:

(Step 1) a step of preparing a toner core particle dispersion liquid in which toner core particles are dispersed in an aqueous medium, and (Step 2) a step of mixing fine silica particles and a polymerizable monomer (monomer) capable of producing a binder resin component with the toner core particle dispersion liquid, and subjecting the monomer to a polymerization reaction in the toner core particle dispersion liquid to form, on the toner core particles, cohesion clusters containing fine silica particles and the binder resin.

In step 1, examples of the method for preparing the toner core particle dispersion liquid include a method of using a dispersion liquid of toner core particles produced in an aqueous medium as it is, and a method of adding dry toner core particles to an aqueous medium, and mechanically dispersing the toner core particles. In the case where dry toner core particles are dispersed in an aqueous medium, a dispersing aid may be used.

The dispersing aid may be a known dispersion stabilizer, a surfactant, or the like.

Specifically, Examples of the Dispersion Stabilizer Include: inorganic dispersion stabilizers such as tricalcium phosphate, hydroxyapatite, magnesium phosphate, zinc phosphate, aluminum phosphate, calcium carbonate, magnesium carbonate, calcium hydroxide, magnesium hydroxide, aluminum hydroxide, calcium metasilicate, calcium sulfate, barium sulfate, bentonite, silica, and alumina; and organic dispersion stabilizers such as polyvinyl alcohol, gelatin, methylcellulose, methylhydroxypropylcellulose, ethylcellulose, a sodium salt of carboxymethylcellulose, and starch.

Examples of the surfactant include: anionic surfactants such as alkyl sulfate ester salt, alkylbenzene sulfonate salts, and fatty acid salts; nonionic surfactants such as polyoxyethylene alkyl ethers and polyoxypropylene alkyl ethers; and cationic surfactants such as alkylamine salts and quaternary ammonium salts.

In step 1, the solid content of the toner core particle dispersion liquid is preferably adjusted to 10% by mass or more and 50% by mass or less.

In step 2, the fine silica particles and the monomer capable of producing a binder component may be added to the toner core particle dispersion liquid as they are, or a dispersion liquid in which the fine silica particles and the monomer are dispersed in advance may be added to the toner core particle dispersion liquid. As a method of dispersing the fine silica particles and the monomer, the dispersing aids described as examples in the section of step 1 can be used.

Examples of the binder component include polymers obtained from monofunctional polymerizable monomers or polyfunctional polymerizable monomers, copolymers obtained by combining two or more of these, and mixtures thereof.

Examples of the polymerizable monomers include: styrene derivatives such as styrene, α-methylstyrene, β-methylstyrene, o-methylstyrene, m-methylstyrene, p-methylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene, and p-phenylstyrene; acrylic polymerizable monomers such as methyl acrylate, ethyl acrylate, n-propyl acrylate, iso-propyl acrylate, n-butyl acrylate, iso-butyl acrylate, tert-butyl acrylate, n-amyl acrylate, n-hexyl acrylate, 2-ethylhexyl acrylate, n-octyl acrylate, n-nonyl acrylate, cyclohexyl acrylate, benzyl acrylate, dimethyl phosphate ethyl acrylate, diethyl phosphate ethyl acrylate, dibutyl phosphate ethyl acrylate, and 2-benzoyloxyethyl acrylate; methacrylic polymerizable monomers such as methyl methacrylate, ethyl methacrylate, n-propyl methacrylate, iso-propyl methacrylate, n-butyl methacrylate, isobutyl methacrylate, tert-butyl methacrylate, n-amyl methacrylate, n-hexyl methacrylate, 2-ethylhexyl methacrylate, n-octyl methacrylate, n-nonyl methacrylate, diethyl phosphate ethyl methacrylate, and dibutyl phosphate ethyl methacrylate; methylene aliphatic monocarboxylic acid esters; vinyl esters such as vinyl acetate, vinyl propionate, vinyl butyrate, vinyl benzoate, and vinyl formate; vinyl ethers such as vinyl methyl ether, vinyl ethyl ether, and vinyl isobutyl ether; vinyl ketones such as vinyl methyl ketone, vinyl hexyl ketone, and vinyl isopropyl ketone; trifunctional silane compounds having a methacryloxyalkyl group as a substituent, such as γ-methacryloxypropyltrimethoxysilane, γ-methacryloxypropyltriethoxysilane, γ-methacryloxy octyltrimethoxysilane, γ-methacryloxypropyldiethoxymethoxysilane, and γ-methacryloxypropylethoxydimethoxysilane; and trifunctional silane compounds having an acryloxyalkyl group as a substituent, such as γ-acryloxypropyltrimethoxysilane, γ-acryloxypropyltriethoxysilane, γ-acryloxyoctyltrimethoxysilane, γ-acryloxypropyldiethoxymethoxysilane, and γ-acryloxypropylethoxydimethoxysilane.

Of these, a trifunctional silane compound can be used from the viewpoint of high affinity for silica. Such a trifunctional silane compound may be used in combination with an organosilicon compound having four reactive groups per molecule (tetrafunctional silane), an organosilicon compound having two reactive groups per molecule (bifunctional silane), or an organosilicon compound having one reactive group per molecule (monofunctional silane). Examples of the organosilicon compounds include: dimethyldiethoxysilane, tetraethoxysilane, hexamethyldisilazane, 3-aminopropyltrimethoxysilane, 3-aminopropyltriethoxysilane, 3-(2-aminoethyl)aminopropyltrimethoxysilane, 3-(2-aminoethyl)aminopropyltriethoxysilane, and trifunctional vinyl silanes such as vinyltriisocyanatosilane, vinyltrimethoxysilane, vinyltriethoxysilane, vinyldiethoxymethoxysilane, vinylethoxydimethoxysilane, vinylethoxydihydroxysilane, vinyldimethoxyhydroxysilane, vinylethoxymethoxyhydroxysilane, and vinyldiethoxyhydroxysilane.

In step 2, fine silica particles and a monomer serving as a binder component are added to and mixed with the toner core particle dispersion liquid. In this step, the temperature of the toner core particle dispersion liquid may be adjusted to a temperature suitable for a polymerization reaction in advance. Subsequently, while the toner core particles, the fine silica particles, and the monomer are mixed, a polymerization initiator is added to thereby conducting polymerization of the added monomer, so that cohesion clusters containing the fine silica particles and the binder component are externally added to the toner core particles. Thus, a dispersion liquid of toner particles is prepared.

A known polymerization initiator can be used as the polymerization initiator without particular limitation. Specific examples thereof include: peroxide polymerization initiators such as hydrogen peroxide, acetyl peroxide, cumyl peroxide, tert-butyl peroxide, propionyl peroxide, benzoyl peroxide, chlorobenzoyl peroxide, dichlorobenzoyl peroxide, bromomethyl benzoyl peroxide, lauroyl peroxide, ammonium persulfate, sodium persulfate, potassium persulfate, diisopropyl peroxycarbonate, tetralin hydroperoxide, 1-phenyl-2-methylpropyl-1-hydroperoxide, pertriphenylacetic acid-tert-hydroperoxide, tert-butyl performate, tert-butyl peracetate, tert-butyl peroxybenzoate, tert-butyl perphenylacetate, tert-butyl permethoxyacetate, per-N-(3-toluyl) palmitic acid-tert-butylbenzoyl peroxide, t-butylperoxy-2-ethylhexanoate, t-butyl peroxypivalate, t-butyl peroxyisobutyrate, t-butyl peroxyneodecanoate, methyl ethyl ketone peroxide, diisopropyl peroxycarbonate, cumene hydroperoxide, 2,4-dichlorobenzoyl peroxide, and lauroyl peroxide; and azo or diazo polymerization initiators such as 2,2'-azobis-(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile, and azobisisobutyronitrile.

Filtration Step, Washing Step, Drying Step, Classification Step, and External Addition Step Subsequently, a filtration step of filtering solid components of toner particles, and as necessary, a washing step, a drying step, and a classification step of adjusting the particle diameter are performed to produce toner particles. The toner particles may be used as a toner as they are. As necessary, the toner particles can be mixed with an external additive such as an inorganic fine powder using a mixer to cause the external additive to be attached to the toner particles, thereby producing a toner.

Characteristics and Configuration of Developing Roller

A developing roller according to the present disclosure has an Asker C hardness of 56 degrees or more and 75 degrees or less, as measured on a surface thereof. When the Asker C hardness is 56 degrees or more, adhesion of a disintegrated product of cohesion clusters present on the surface of the toner can be reduced, and the disintegrated product can be efficiently scraped off from the developing roller. When the Asker C hardness is 75 degrees or less, the rubbing load against the toner can be reduced, and the deterioration rate of the toner can be reduced. Details of the method for measuring the Asker C hardness will be described later.

Next, components constituting the developing roller according to the present disclosure and a method for producing the developing roller will be described in more detail below.

Figure 1B:
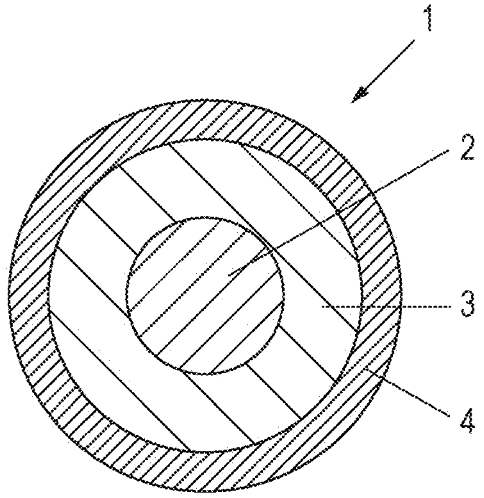

As illustrated in FIGS. 1A and 1B, a developing roller 1 includes a conductive shaft member 2 and at least one elastic layer 3 on the conductive shaft member 2. The developing roller 1 may optionally include a surface layer 4.

Conductive Shaft Member

The conductive shaft member has a function of supporting an elastic layer disposed thereon. Examples of the material of the conductive shaft member include metals such as iron, copper, aluminum, and nickel; and alloys containing these metals, such as stainless steel, duralumin, brass, and bronze. These may be used alone or in combination of two or more thereof. For the purpose of providing scratch resistance, the surface of the conductive shaft member may be subjected to plating treatment as long as the conductivity is not impaired. Furthermore, a shaft member produced by covering the surface of a resin shaft member with a metal to provide the surface with conductivity or a shaft member produced from a conductive resin composition can also be used.

Elastic Layer

The elastic layer is disposed on the conductive shaft member and may have a single-layer structure or a layered structure including two or more layers.

The elastic layer can contain a resin and an elastic material such as rubber. Specifically, examples of the resin and the rubber include polyurethane resins, polyamides, urea resins, polyimides, melamine resins, fluorine resins, phenolic resins, alkyd resins, silicone rubber, polyesters, ethylene-propylene-diene copolymer rubber (EPDM), acrylonitrile-butadiene rubber (NBR), chloroprene rubber (CR), natural rubber (NR), isoprene rubber (IR), styrene-butadiene rubber (SBR), fluororubber, epichlorohydrin rubber, hydrogenated NBR, and urethane rubber. Among these materials, a polyurethane resin or a silicone rubber is preferably contained in view of flexibility and deformation recovery performance.

These resins and rubbers may be used alone or as a mixture of two or more thereof, as needed. When two or more elastic layers are provided, elastic layers composed of the same type of resin and rubber may be provided, or elastic layers composed of different types of resin and rubber may be provided.

The materials of the resin and rubber can be identified by measuring an elastic layer of the developing roller using a Fourier transform infrared-visible spectrophotometer.

Specific examples of the polyurethane resin used for the elastic layer include ether-based polyurethane resins, ester-based polyurethane resins, acrylic-based polyurethane resins, and carbonate-based polyurethane resins. These polyurethane resins may be those obtained by a reaction between a known polyol and a known isocyanate compound.

Specific examples of the polyol include polyether polyols such as polyethylene glycol, polypropylene glycol, and polytetramethylene glycol; polyester polyols such as polyethylene succinate diol, polybutylene succinate diol, polyethylene adipate diol, and polybutylene adipate diol; and polycarbonate polyols such as polyethylene carbonate diol and polybutylene carbonate diol.

Examples of the isocyanate component that is caused to react with the polyol component include, but are not particularly limited to, aliphatic polyisocyanates such as ethylene diisocyanate and 1,6-hexamethylene diisocyanate (HDI); alicyclic polyisocyanates such as isophorone diisocyanate (IPDI), cyclohexane 1,3-diisocyanate, and cyclohexane 1,4-diisocyanate; aromatic isocyanates such as 2,4-tolylene diisocyanate, 2,6-tolylene diisocyanate (TDI), 4,4'-diphenylmethane diisocyanate (MDI), polymeric diphenylmethane diisocyanate, xylylene diisocyanate, and naphthalene diisocyanate; copolymers, isocyanurates, TMP adducts, and biurets of the foregoing, and blocks of the foregoing.

Of these, aromatic isocyanates such as tolylene diisocyanates, diphenylmethane diisocyanates, and polymeric diphenylmethane diisocyanate are more suitably used.

Examples of the silicone rubber used for the elastic layer include polydimethylsiloxane, polymethyltrifluoropropylsiloxane, polymethylvinylsiloxane, polyphenylvinylsiloxane, and copolymers of these siloxanes.

The elastic layer may contain a conducting agent. The conducting agent may be an ion conductive agent or an electron conductive agent such as carbon black. From the viewpoint of preventing bleeding, an electron conductive agent can be used, and in particular, carbon black, which is inexpensive, is suitably used. The volume resistivity of the elastic layer is usually preferably in a range of $1.0\times10^{3}$ Ω·cm or more and $1.0\times10^{11}$ Ω·cm or less.

Examples of the carbon black specifically include conductive carbon black, such as "Ketjenblack" (trade name, manufactured by Lion Corporation) and acetylene black; and carbon black for rubbers, such as SAF, ISAF, HAF, FEF, GPF, SRF, FT, and, MT. In addition, for example, carbon black for color ink, which has been subjected to an oxidation treatment, and pyrolytic carbon black can be used as the carbon black.

The amount of carbon black added is preferably 5 parts by mass or more and 50 parts by mass or less relative to 100 parts by mass of the total of the resin and the rubber in the elastic layer. The carbon black content in the elastic layer can be measured, for example, using an analysis technique such as thermogravimetric analysis.

Examples of the electron conductive agent that can be used for the elastic layer include, in addition to the carbon black, graphite such as natural graphite and synthetic graphite; powders of a metal such as copper, nickel, iron, or aluminum; powders of a metal oxide such as titanium oxide, zinc oxide, or tin oxide; and conductive polymers such as polyaniline, polypyrrole, and polyacetylene. These may be used alone or in combination of two or more thereof as necessary. The amount of conducting agent added can be appropriately determined.

The elastic layer may optionally contain roughness-control particles. The roughness-control particles may be fine particles of a polyurethane resin, a polyester resin, a polyether resin, a polyamide resin, an acrylic resin, a polycarbonate resin, or the like. The roughness-control particles preferably have a volume-average particle diameter of 3 μm or more and 20 μm or less. The amount of the particles contained in the elastic layer is preferably 1 part by mass or more and 50 parts by mass or less relative to 100 parts by mass of the total of the resin and the rubber in the elastic layer. The content of the particles in the elastic layer can be measured, for example, using an analysis technique such as thermogravimetric analysis.

The elastic layer may further contain various additives such as a charge control agent, a lubricant, a filler, an antioxidant, and an anti-aging agent as long as the functions of the resin, the rubber, and the conducting agent are not impaired. The amounts of the additives added can be appropriately determined.

Surface Layer

The developing roller according to the present disclosure is optionally provided with a surface layer. Various resins, rubbers, etc., similar to those used for the elastic layer can be used as the material of the surface layer. In particular, a polyurethane resin is suitably used from the viewpoint of exhibiting good triboelectric chargeability to the toner and having wear resistance. Specific examples of the polyurethane resin include those similar to the specific examples of the polyurethane resin used for the elastic layer.

The surface layer may optionally contain a conducting agent, roughness-control particles, and various other additives. These may be similar to those used for the elastic layer.

Method for Producing Developing Roller

The method for producing the developing roller is not particularly limited and may be a known method such as a cast molding method using a liquid rubber or an extrusion molding method using a millable rubber.

The method for forming the surface layer may be, for example, a method in which a coating liquid prepared in advance is applied onto the elastic layer by dipping coating, spray coating, or the like.

Process Cartridge

Figure 2:
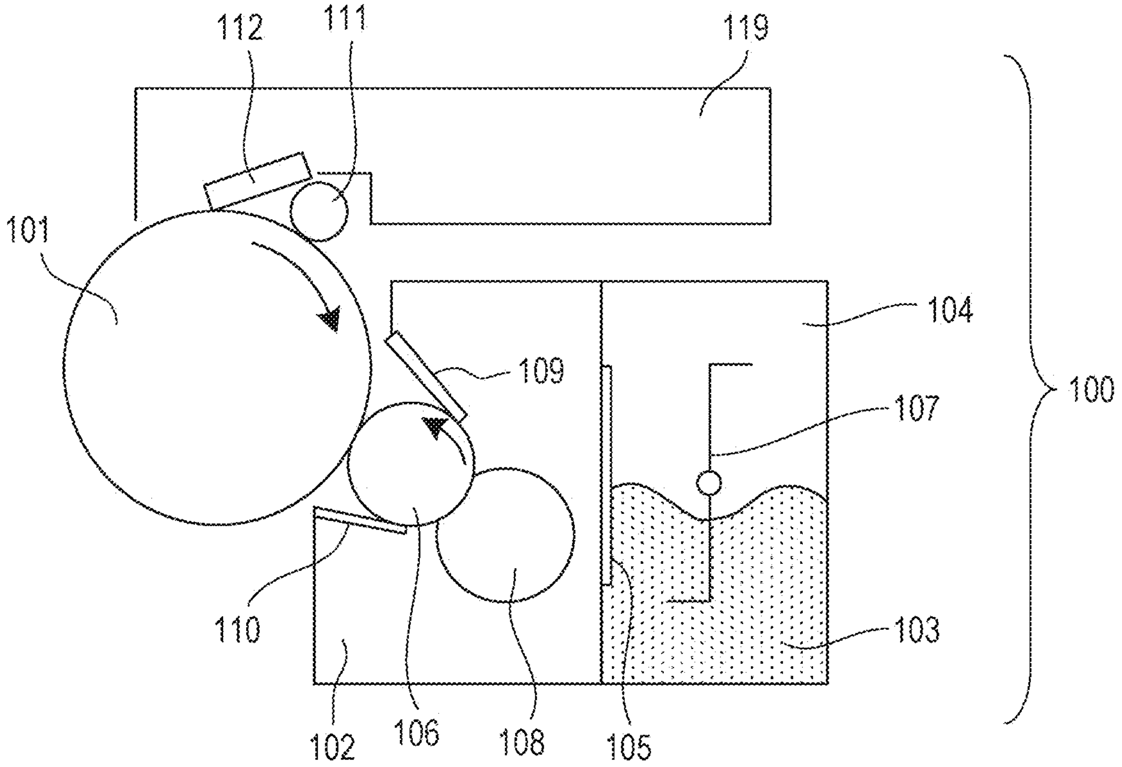
FIG. 2 is a schematic configuration view of a process cartridge according to the present disclosure.

A process cartridge according to the present disclosure includes the toner and the developing roller according to the present disclosure. FIG. 2 is a schematic sectional view of an example of the process cartridge according to the present disclosure.

A process cartridge 100 illustrated in FIG. 2 is configured to be detachably attachable to an electrophotographic apparatus main body. The process cartridge 100 includes a developing chamber 102 having an opening portion in a part facing a photosensitive member 101. A toner container 104 that accommodates a toner 103 is disposed at the back of the developing chamber 102. A toner stirring mechanism 107 is disposed in the toner container 104 as necessary. An opening portion communicating the developing chamber 102 and the toner container 104 is partitioned by a sealing member 105, and the sealing member 105 is removed when the process cartridge 100 is first used. A developing roller 106, a toner supplying roller 108, a developing blade 109, and a toner blowout prevention sheet 110 are disposed in the developing chamber 102.

The toner 103 is applied to the developing roller 106 by the toner supplying roller 108. The developing roller 106 is rotated in the direction indicated by the arrow in the drawing, and the toner 103 born on the developing roller 106 is controlled to have a predetermined layer thickness by the developing blade 109 and then sent to a developing region facing the photosensitive member 101.

The process cartridge 100 includes a charging roller 111 in addition to the above configuration.

In addition, a cleaning blade 112 and a residual toner container 119 are disposed as necessary.

Electrophotographic Image-Forming Apparatus

Figure 3:
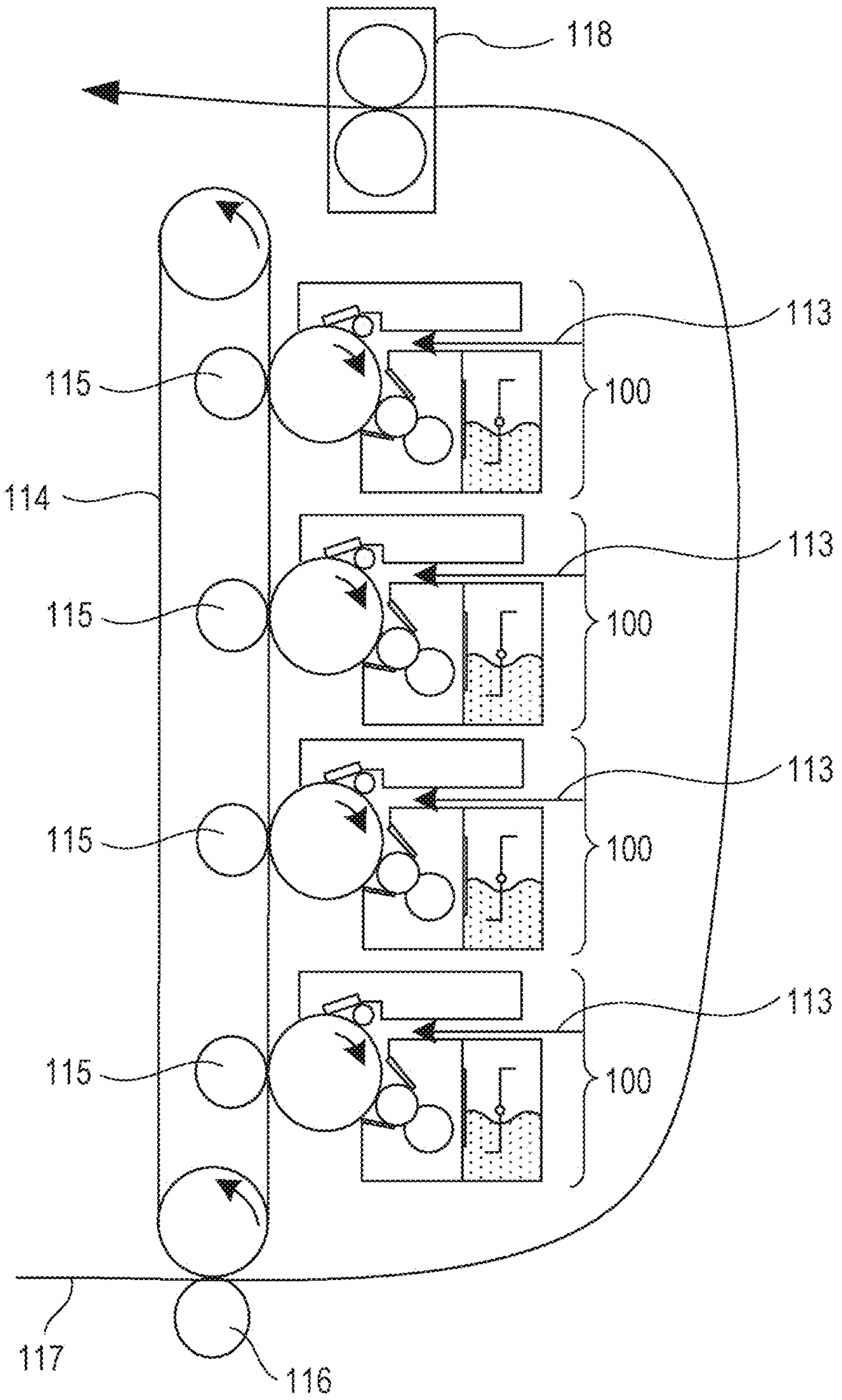
FIG. 3 is a schematic configuration view of an electrophotographic apparatus including a process cartridge according to the present disclosure.

FIG. 3 is a schematic sectional view of an electrophotographic apparatus including a process cartridge according to the present disclosure. This electrophotographic apparatus can be used with the process cartridge 100 illustrated in FIG. 2 mounted.

A printing operation of the electrophotographic apparatus will be described below. The photosensitive member 101 is uniformly charged by the charging roller 111 connected to a bias power supply (not illustrated). Next, an electrostatic latent image is formed on the surface of the photosensitive member 101 with exposure light 113 for writing the electrostatic latent image. The exposure light 113 can be either LED light or laser light.

Next, a toner that is charged with a negative polarity is provided to (developed into) the electrostatic latent image by the developing roller 106 installed in the process cartridge 100 configured to be detachably attachable to the electrophotographic apparatus main body. Next, a toner image is formed on the photosensitive member 101, and thus the electrostatic latent image is converted into a visible image.

At this time, a voltage is applied to the developing roller 106 by the bias power supply (not illustrated).

The tone image developed on the photosensitive member 101 is primarily transferred to an intermediate transfer belt 114. A primary transfer member 115 is in contact with the back surface of the intermediate transfer belt 114. By applying a voltage to the primary transfer member 115, the toner image with a negative polarity is primarily transferred from the photosensitive member 101 to the intermediate transfer belt 114. The primary transfer member 115 may have a form of a roller or a form of a blade.

In the electrophotographic apparatus illustrated in FIG. 3, a total of four process cartridges 100, namely, a process cartridge 100 containing a toner of yellow, a process cartridge 100 containing a toner of cyan, a process cartridge 100 containing a toner of magenta, and a process cartridge 100 containing a toner of black are detachably attached to the electrophotographic apparatus main body. The processes of charging, exposure, development, and primary transfer are sequentially performed with a predetermined time difference, and a state in which four-color toner images are superimposed to express a full-color image is created on the intermediate transfer belt 114.

The toner images on the intermediate transfer belt 114 are conveyed to a position facing a secondary transfer member 116 as the intermediate transfer belt 114 rotates. At this time, a recording sheet, which is a transfer medium, is being conveyed between the intermediate transfer belt 114 and the secondary transfer member 116 at a predetermined timing along a conveyance route 117 of the recording sheet. Subsequently, a secondary transfer bias is applied to the secondary transfer member 116 to thereby transfer the toner images on the intermediate transfer belt 114 to the recording sheet. The recording sheet to which the toner images have been transferred by the secondary transfer member 116 is conveyed to a fixing device 118, and the toner images on the recording sheet are melted and fixed on the recording sheet. The recording sheet is then discharged to the outside of the electrophotographic apparatus. Thus, the printing operation is finished. Note that toner images remaining on the photosensitive member 101 without being transferred from the photosensitive member 101 to the intermediate transfer belt 114 are scraped off by the cleaning blade 112 and contained in the residual toner container 119.

Method for Measuring Physical Properties

Methods for measuring physical properties according to the present disclosure will be described below.

Methods for measuring weight-average particle diameter (D4) and number-average particle diameter (D1)

The weight-average particle diameter (D4) and the number-average particle diameter (D1) of a toner are computed as described below. The measuring apparatus used is a precision particle size distribution measuring apparatus "Coulter Counter Multisizer 3" (registered trademark, manufactured by Beckman Coulter, Inc.) equipped with a 100 μm aperture tube utilizing an aperture impedance method. Accessory dedicated software "Beckman Coulter, Multisizer 3 Version 3.51" (manufactured by Beckman Coulter, Inc.) is used to set the measurement conditions and analyze measured data. The measurement is performed with the number of effective measuring channels of 25,000.

An aqueous electrolyte solution used in the measurement may be a solution prepared by dissolving special grade sodium chloride in deionized water so as to have a concentration of about 1% by mass, for example, "ISOTON II" (manufactured by Beckman Coulter, Inc.).

Before the measurement and analysis, the dedicated software was set up as described below.

On the "Change standard measurement method (SOMME)" screen of the dedicated software, the total count number in the control mode is set to 50,000 particles, the number of times of measurement is set to 1, and the Kd value is set to a value obtained by using "standard particles 10.0 μm" (manufactured by Beckman Coulter, Inc.). The "Threshold/noise level measurement button" is pushed to automatically set the threshold and the noise level. The current is set to 1,600 μA, the gain is set to 2, and the electrolyte solution is set to Isoton II. The "Flushing of aperture tube after measurement" is checked.

On the "Conversion setting of pulse into particle diameter" screen of the dedicated software, the bin interval is set to the logarithmic particle diameter, the particle diameter bin is set to a 256 particle diameter bin, and the particle diameter range is set to 2 μm to 60 μm.

A specific measurement method is as follows.

(1) A 250 mL round-bottom glass beaker dedicated for Multisizer 3 is charged with about 200 mL of the aqueous electrolyte solution and is placed on a sample stand. A stirrer rod is rotated counterclockwise at a rate of 24 revolutions/sec to perform stirring. Soiling and air bubbles in the aperture tube are removed in advance using the function of "Flushing of aperture tube" of the dedicated software.

(2) A 100 mL flat-bottom glass beaker is charged with about 30 mL of the aqueous electrolyte solution. To the aqueous electrolyte solution, about 0.3 mL of a diluted solution of a dispersant "Contaminon N" (a 10 mass % aqueous solution of a neutral detergent for cleaning precision measuring instruments, the detergent being composed of a nonionic surfactant, an anionic surfactant, and an organic builder and having a pH of 7, manufactured by FUJIFILM Wako Pure Chemical Corporation), the diluted solution being diluted about 3-fold by mass with deionized water, is added.

(3) An ultrasonic disperser "Ultrasonic Dispersion System Tetra 150" (manufactured by Nikkaki-Bios Co., Ltd.) is prepared. The ultrasonic disperser includes two oscillators with an oscillation frequency of 50 kHz in a state of a phase difference of 180 degrees, and has an electrical output of 120 W. A water tank of the ultrasonic disperser is charged with about 3.3 L of deionized water, and about 2 mL of Contaminon N is added to the water tank.

(4) The beaker in (2) above is placed in a beaker-holding hole in the ultrasonic disperser, and the ultrasonic disperser is operated. The position of the beaker in the height direction is adjusted such that the resonance of the surface of the aqueous electrolyte solution in the beaker is the highest.

(5) In a state where the aqueous electrolyte solution in the beaker in (4) above is irradiated with ultrasonic waves, about 10 mg of a toner is added little by little to the aqueous electrolyte solution and dispersed. The ultrasonic dispersion treatment is further continued for 60 seconds. During the ultrasonic dispersion, the water temperature of the water tank is controlled as appropriate in the range of 10° C. or higher and 40° C. or lower.

(6) The aqueous electrolyte solution in which the toner is dispersed and which is prepared in (5) above is added dropwise with a pipette into the round-bottom beaker prepared in (1) above placed on the sample stand such that the measurement concentration is about 5%. The measurement is performed until the number of measured particles reaches 50,000.

(7) The measured data are analyzed using the dedicated software attached to the apparatus to compute the weight-average particle diameter (D4) and the number-average particle diameter (D1). The "Average diameter" on the "Analysis/volume statistics (arithmetic mean)" screen in the setting of graph/volume % in the dedicated software is the weight-average particle diameter (D4). The "Average diameter" on the "Analysis/number statistics (arithmetic mean)" screen in the setting of graph/number % in the dedicated software is the number-average particle diameter (D1).

Method for Obtaining Backscattered Electron Image of Toner Surface

A base material exposure ratio of a toner is calculated using a backscattered electron image of the surface of a toner particle.

The backscattered electron image of the toner surface is obtained with a scanning electron microscope (SEM).

Backscattered electron images obtained by SEM are also called "compositional images", in which the lower atomic number the element has, the more darkly the element is detected, and the higher atomic number the element has, the more brightly the element is detected.

In general, toner particles are resin particles mainly containing compositions that contain carbon as a main component, such as a resin component and a release agent. When fine silica particles and a metal oxide are present on the surface of a toner particle, in a backscattered electron image obtained by SEM, the fine silica particles and the meal oxide are observed as bright portions, and resin portions containing carbon as a main component are observed as dark portions.

The apparatus and observation conditions for the SEM are as follows.

Apparatus used: ULTRA PLUS, manufactured by Carl Zeiss Microscopy Company
Accelerating voltage: 1.0 kV
WD: 2.0 mm
Aperture Size: 30.0 μm
Detected signal: energy-selective backscattered electrons (EsB)
EsB Grid: 800 V
Magnification for observation: 50,000 times
Contrast: 63.0±5.0% (reference value)
Brightness: 38.0±5.0% (reference value)
Resolution: 1,024×768
Pretreatment: Toner particles are scattered on a carbon tape (no depositing).

The contrast and the brightness are appropriately set according to the conditions of the apparatus used. The accelerating voltage and the EsB Grid are set so as to achieve acquisition of structural information of the outermost surface of the toner particle, prevention of charge-up of an undeposited sample, and selective detection of high-energy backscattered electrons. The observation field of view to be selected is a portion near the apex at which the curvature of the toner particle is smallest.

Method for Checking Whether Dark Portion in Backscattered Electron Image is Derived from Carbon Atom Whether a dark portion observed in a backscattered electron image is derived from a resin is checked by superimposing an elemental mapping image obtained by energy dispersive x-ray spectroscopy (EDS) that can be acquired using a scanning electron microscope (SEM) and the backscattered electron image.

The apparatuses and observation conditions for the SEM and EDS are as follows.

Apparatus (SEM) used: ULTRA PLUS, manufactured by Carl Zeiss Microscopy Company
Apparatus (EDS) used: NORAN System 7 and Ultra Dry EDS Detector, manufactured by Thermo Fisher Scientific Inc.
Accelerating voltage: 5.0 kV
WD: 7.0 mm
Aperture Size: 30.0 μm
Detected signal: secondary electrons (SE2)
Magnification for observation: 50,000 times
Mode: Spectral Imaging
Pretreatment: Toner particles are scattered on a carbon tape, followed by platinum sputtering.

The elemental mapping image obtained by the above method and the backscattered electron image are superimposed, and it is checked whether the carbon atom portions of the mapping image and dark portions of the backscattered electron image match.

Method for Checking Dispersed State of Binder Component Contained in Cohesion Cluster The dispersed state of the binder component contained in a cohesion cluster is calculated using a backscattered electron image of a cohesion cluster on a toner surface. The backscattered electron image of a cohesion cluster on a toner surface is obtained in the same manner as the method for obtaining a backscattered electron image of a toner surface.

For the obtained backscattered electron image, the dispersed state of resin particles contained in the cohesion cluster is calculated with image processing software ImageJ (developed by Wayne Rasband). The procedure is described below.

First, a backscattered electron image to be analyzed is converted to an 8-bit image using Type in the Image menu. Next, the Median diameter is set to 2.0 pixels from Filters in the Process menu to reduce image noise. An image center is estimated while an observation condition display section displayed at a lower part of the backscattered electron image is excluded, and a 1.5 μm square range is selected from the image center of the backscattered electron image with a rectangle tool (Rectangle Tool) in a toolbar.

Next, from Adjust in the Image menu, Threshold is selected. In the manual operation, all pixels corresponding to brightness B1 are selected, and Apply is clicked to obtain a binarized image. Through this operation, pixels corresponding to A1 are displayed in black (pixel group A1), and pixels corresponding to A2 are displayed in white (pixel group A2). An image center is estimated again while the observation condition display section displayed at the lower part of the backscattered electron image is excluded, and a 1.5 μm square range is selected from the image center of the backscattered electron image with the rectangle tool (Rectangle Tool) in the toolbar.

Next, a scale bar in the observation condition display section displayed at the lower part of the backscattered electron image is selected with a straight line tool (Straight Line) in the toolbar. When Set Scale in the Analyze menu is selected in this state, a new window opens, and a pixel distance of the selected straight line is entered in Distance in Pixels field.

When the value (for example, 100) of the scale bar is entered in Known Distance field of the window, the unit (for example, nm) of the scale bar is entered in Unit of Measurement field, and OK is clicked, scale setting is completed.

Subsequently, Set Measurements in the Analyze Menu is selected, and Area and Feret's diameter are checked. When Analyze Particles in the Analyze Menu is selected, Display Result is checked, and OK is clicked, domain analysis is performed.

Figure 5:
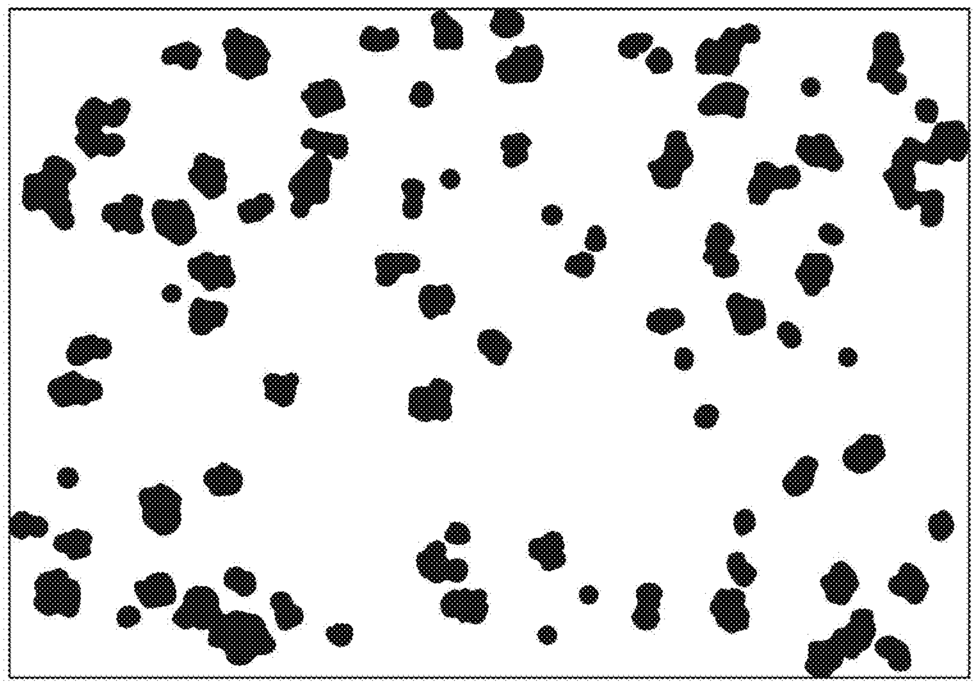
FIG. 5 is an example of an image obtained by performing a predetermined process using ImageJ on an analyzed image obtained in a method for checking the dispersed state of a binder component contained in a cohesion cluster.

Subsequently, the obtained analyzed image is subjected to, Erode processing for 10 pixels using ImageJ and then subjected to Dilate processing for 10 pixels using ImageJ. The Erode processing and Dilate processing are performed from the item of Binary in the Process menu. FIG. 5 shows an example of an image obtained by performing the above processing.

Figure 6:
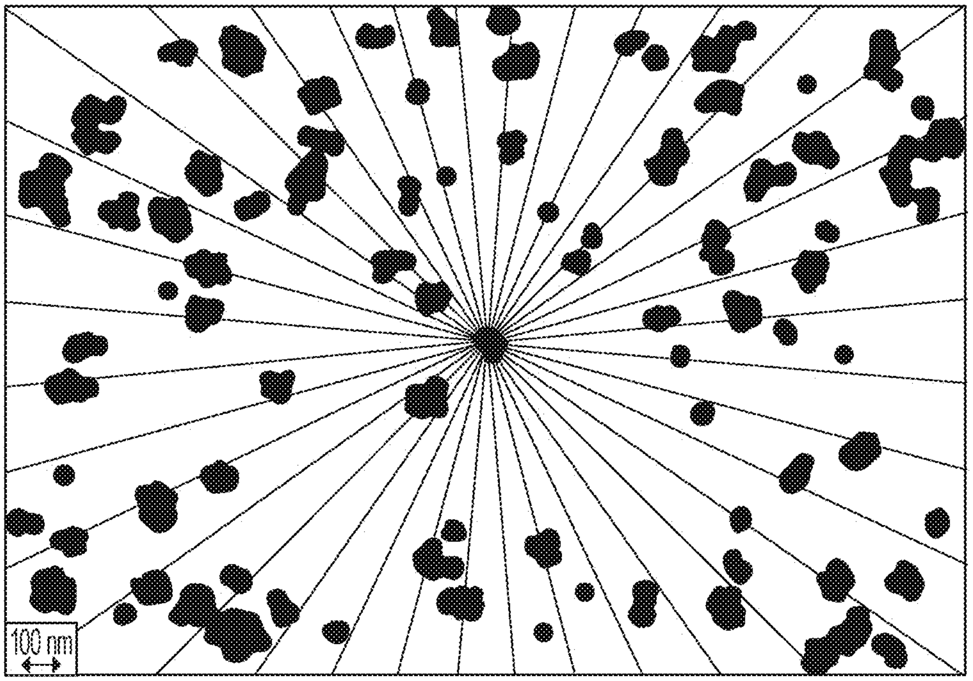
FIG. 6 is an example of an image in which the midpoint of the image of FIG. 5 is defined as a reference point, and a total of 18 line segments are drawn at intervals of 10° from one end to the other end of the image so as to pass through the reference point.

For the analyzed image obtained after the processing, the midpoint of the analyzed image is defined as a reference point, and a total of 18 straight lines are drawn with the straight line tool (Straight Line) in the toolbar at intervals of 10° from one end to the other end of the image so as to pass through the reference point. FIG. 6 shows an example of an image in which the line segments are drawn.

Subsequently, a length L of a line segment with a continuous bright portion on each of the straight lines is measured, and the number of straight lines having a line segment with a length L of 100 nm or more is counted to check whether the number of the straight lines is 12 or more in the cohesion cluster.

Method for Checking Ratio of Toner Particles Having Cohesion Cluster in which the Number of Straight Lines is 12 or More For 30 toner particles having a cohesion cluster and included in a toner to be evaluated, the above procedure is performed on the cohesion cluster, and the number of toner particles having a cohesion cluster in which the number of the straight lines is 12 or more is counted. A ratio A of toner particles having a cohesion cluster in which the number of the straight lines is 12 or more is calculated by the following formula.

$$A=\{(\text{the number of toner particles having cohesion cluster in which the number of the straight lines is 12 or more})/30\}$$

Method for Checking Area Fraction of Binder Component Contained in Cohesion Cluster The area fraction of the binder component is calculated based on a domain D1 derived from the binder component and a domain D2 derived from a component other than the binder component using a backscattered electron image of a cohesion cluster on the toner surface. The backscattered electron image of the cohesion cluster on the toner surface is obtained in the same manner as the method for obtaining a backscattered electron image of a toner surface.

The analysis of the domains D1 and D2 is conducted using a backscattered electron image of the outermost surface of a toner particle obtained by the above method with image processing software ImageJ (developed by Wayne Rasband). The procedure is described below.

First, a backscattered electron image to be analyzed is converted to an 8-bit image using Type in the Image menu. Next, the Median diameter is set to 2.0 pixels from Filters in the Process menu to reduce image noise. An image center is estimated while an observation condition display section displayed at a lower part of the backscattered electron image is excluded, and a 1.5 μm square range is selected from the image center of the backscattered electron image with a rectangle tool (Rectangle Tool) in a toolbar.

Next, using the function of Freehand selections in the Image menu, only portions where carbon atom portions of the mapping image and dark portions of the backscattered electron image match are selected, and all the portions are filled with black. Furthermore, all portions are filled with white except for the portions where carbon atom portions of the mapping image and dark portions of the backscattered electron image match. Next, from Adjust, Threshold is selected. In the manual operation, 128, which is the middle tone between black and white in the 8-bit image, is selected as a threshold, and Apply is clicked to obtain a binarized image.

Through this operation, pixels corresponding to the domain D1 (binder component) are displayed in black (pixel group A1), and pixels corresponding to the domain D2 (other than binder component) are displayed in white (pixel group A2).

An image center is estimated again while the observation condition display section displayed at the lower part of the backscattered electron image is excluded, and a 1.5 μm square range is selected from the image center of the backscattered electron image with the rectangle tool (Rectangle Tool) in the toolbar.

Next, a scale bar in the observation condition display section displayed at the lower part of the backscattered electron image is selected with a straight line tool (Straight Line) in the toolbar. When Set Scale in the Analyze menu is selected in this state, a new window opens, and a pixel distance of the selected straight line is entered in Distance in Pixels field.

When the value (for example, 100) of the scale bar is entered in Known Distance field of the window, the unit (for example, nm) of the scale bar is entered in Unit of Measurement field, and OK is clicked, scale setting is completed.

Subsequently, Set Measurements in the Analyze Menu is selected, and Area and Feret's diameter are checked. When Analyze Particles in the Analyze Menu is selected, Display Result is checked, and OK is clicked, domain analysis is performed.

From newly opened Results window, the area (Area) for each domain corresponding to the domain D1 formed by the pixel group A1 and the domain D2 formed by the pixel group A2 is acquired.

The sum of the obtained areas of the domain D1 derived from the binder component is denoted by S1 ($\mu m^2$), and the sum of the obtained areas of the domain D2 derived from a component other than the binder component is denoted by S2 ($\mu m^2$). An area fraction S of the binder component is calculated from S1 an S2 obtained above using the following formula.

$$S(\text{area }\%)=\{S1/(S1+S2)\}\times 100$$

The above procedure is performed for 10 fields of view per toner particle to be evaluated, and the arithmetic mean value is used as the area fraction.

Method of Observing Toner and Method of Calculating the Number of Toner Particles The toner is observed with a scanning electron microscope (SEM).

The apparatus and observation conditions for the SEM are as follows.

Apparatus used: ULTRA PLUS, manufactured by Carl Zeiss Microscopy Company
Accelerating voltage: 1.0 kV
WD: 2.0 mm
Aperture Size: 30.0 μm
Detected signal: secondary electrons (SE2)
Magnification for observation: 2,000 times
Contrast: 45.0±5.0% (reference value)
Brightness: 38.0±5.0% (reference value)
Resolution: 1,024×768
Pretreatment: Toner particles are scattered on a carbon tape (no depositing).

The contrast and the brightness are appropriately set according to the conditions of the apparatus used. The accelerating voltage is set so as to achieve acquisition of structural information of the outermost surface of the toner particle and prevention of charge-up of an undeposited sample.

As for the number of observation fields of view, the number of toner particles, the entirety of each of the toner particles being located within the observation field of view in the obtained secondary electron image, is counted, and when the number of toner particles is represented by $T_{all}$ (particles), the observation is continued up to the number of fields of view at which $T_{all}$ is 300 or more.

Method of Calculating Number Percentage CI of Toner Particles Having Cohesion Cluster In the secondary electron images of all the fields of view obtained in the above observation, among toner particles, the entirety of each of the toner particles being located within the observation field of view, the number of toner particles having a cohesion cluster is counted and expressed as $T_{agg}$ (particles). As the toner having a cohesion cluster, the number of toner particles as shown in FIG. 4 is counted.

CI (number %) is calculated from $T_{all}$ (particles) and $T_{agg}$ (particles) determined above using the following formula.

$$CI(\text{number } \%) = T_{agg}/T_{all} \times 100$$

Method of Measuring Size of Cohesion Cluster and Method of Counting the Number of Toner Particles Having Cohesion Cluster In the above-described scanning electron microscopy, a photograph of the entirety of the toner is taken at an appropriate magnification (5 k to 10 k) and saved. The image resolution is set to 1,024×768 pixels.

From the obtained SEM image, a portion determined to be a cohesion cluster is selected on the image using image analysis software ImageJ (developed by Wayne Rasband). The size of the cohesion cluster is defined by the maximum Feret diameter in this selected region. The procedure of the calculation is described below.

(a) In [Analyze]-[Set Scale], scale setting is performed.
(b) [Analyze]-[Set Measurements]-[Feret's diameter] is checked.
(c) [Freehand Selections] is selected, and a cohesion cluster on the image is selected by hand.
(d) [Analyze]-[Measure] is selected, and the maximum Feret diameter (Feret) in the selected portion is obtained.
(e) When a plurality of cohesion clusters are present on the image, (c) and (d) are repeated.
(f) For the remaining nine images in the observation of the toner having a cohesion cluster with a maximum Feret diameter of 500 nm or more and 8,000 nm or less, a similar analysis is performed.
(g) The maximum value of Feret (Feret diameter) of the obtained analysis results is determined as the maximum Feret diameter.

Portions having a maximum Feret diameter of 500 nm or more and 8,000 nm or less are determined as cohesion clusters.

The toner is arbitrarily observed with the scanning electron microscope, and the arithmetic mean value of the maximum Feret diameters of a total of 100 cohesion clusters is defined as Ag.

Among toner particles that are arbitrarily observed, number % of toner particles having a cohesion cluster is defined as CI.

Method for Evaluating Whether Silica and Binder Component are Contained in Cohesion Cluster Whether silica and a binder component are contained in a cohesion cluster is checked using STEM-EDX and a scanning electron microscope.

First, for a toner having a cohesion cluster, the sectional structure and the composition of the cohesion cluster are evaluated using STEM-EDX.

Figure 7:
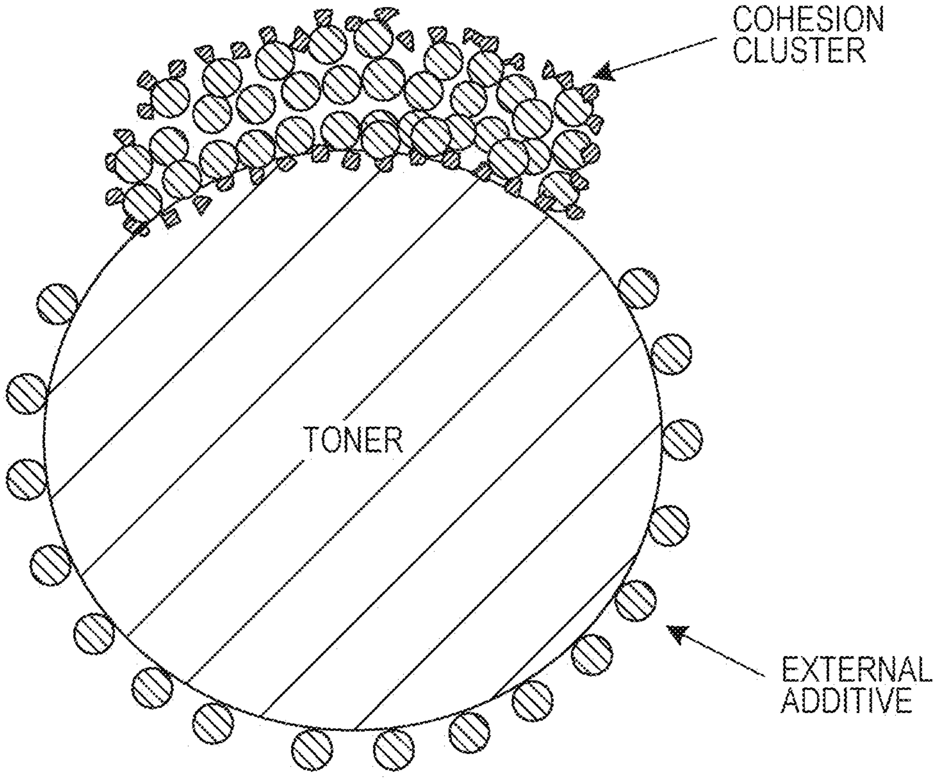
FIG. 7 is a schematic view of a section of a toner having a cohesion cluster.

An Os film (5 nm) and a naphthalene film (20 nm) are formed on the toner as protective films with an osmium plasma coater (Filgen, Inc., OPC80T), and the resulting toner is embedded in a photocurable resin D800 (JEOL Ltd.). Subsequently, a toner-particle section with a film thickness of 100 nm is prepared with an ultrasonic ultramicrotome (Leica microsystems, UC7) at a cutting speed of 1 mm/s. In this case, a plurality of toner particles may be processed at one time to prepare a section of 300 to 500 particles of the toner. FIG. 7 illustrates a schematic view of a section of a toner having a cohesion cluster.

For the prepared section, STEM-EDX observation is performed using the STEM function of TEM-EDX (TEM: JEOL Ltd., JEM-2800 (200 keV), EDX detector: JEOL Ltd., Dry SD 100 GV, EDX system: Thermo Fisher Scientific Inc., NORAN SYSTEM 7). Adjustment is performed such that the probe size of STEM is 1.0 nm, the magnification for observation is 50 k to 300 k, the image size of EDX is 256×256 pixels, and the save rate is 10,000 cps, and an image is acquired by integrating 50 frames. The field of view of the observation position is set such that a cohesion cluster present on an outer peripheral portion of a toner particle is included.

Whether particles containing silica as a main component and a binder component are present in the cohesion cluster can be determined by checking whether portions where silicon and oxygen are observed in large amounts and portions where an element derived from the binder component is observed in a large amount are separately present at the same position. When a resin is used as the binder component, carbon is observed in a large amount.

Next, for the toner having a cohesion cluster, a backscattered electron image is observed using a scanning electron microscope. The image capturing conditions are as follows.

(1) Preparation of Sample

A carbon tape is attached to a sample stage (aluminum sample stage: 12.5 mmφ×6 mm), and a toner is placed thereon. Furthermore, air is blown to remove the excess sample from the sample stage. The sample stage is placed in a sample holder and placed in a scanning electron microscope (Zeiss Company, Ultra Plus).

(2) Setting of Electron Microscope Observation Conditions

Whether a cohesion cluster containing fine silica particles and a binder component is present is checked using an image obtained by backscattered electron image observation with Ultra Plus. In a backscattered electron image, since the image contrast changes depending on the elemental composition, the presence of the fine silica particles and the binder component in the cohesion cluster can be determined. The accelerating voltage is set to 0.7 kV, ECB Grid is set to 500 V, and WD is set to 3.0 mm.

(3) Focal Point Adjustment

The magnification for observation is set to 30,000 (30 k) times, and Alignment and Stigma are adjusted. Next, the field of view is adjusted to an area having a form considered to be a cohesion cluster at an appropriate magnification for observation. By confirming that two types of contrast, namely, contrast considered to correspond to silica and contrast considered to correspond to a binder component are present based on the obtained backscattered electron image, it can be determined that the area is identical to the cohesion cluster that has been subjected to the composition observation by STEM-EDX.

Method of Calculating Number Percentage Ca or Cb of Toner Particles Having Cohesion Cluster when Ultrasonic Wave Treatment is Performed A glass container is charged with about 10 mL of deionized water from which impurity solids and the like have been removed in advance.

To the deionized water, about 0.5 mL of a diluted solution of a dispersant "Contaminon N" (a 10 mass % aqueous solution of a neutral detergent for cleaning precision measuring instruments, the detergent being composed of a nonionic surfactant, an anionic surfactant, and an organic builder and having a pH of 7, manufactured by FUJIFILM Wako Pure Chemical Corporation), the diluted solution being diluted about 3-fold by mass with deionized water, is added. About 0.02 g of a measurement sample is further added, and the following dispersion treatment is performed under stirring using an ultrasonic disperser to prepare a dispersion liquid for measurement. At that time, cooling is performed as appropriate such that the temperature of the dispersion liquid is 10° C. or higher and 40° C. or lower. An ultrasonic homogenizer ("VP-050" (manufactured by TAITEC CORPORATION)) with an oscillation frequency of 30 kHz is used as the ultrasonic disperser. An oscillation portion is caused to enter the dispersion liquid by 1.0 cm, and oscillation is performed under the ultrasonic wave condition A or the ultrasonic wave condition B below.

Ultrasonic wave condition A: output frequency 30 kHz, output capacity 0.75 W, and irradiation time 300 s Ultrasonic wave condition B: output frequency 30 kHz, output capacity 30 W, and irradiation time 300 s The dispersion liquid obtained by the above procedure is filtered through Kiriyama filter paper (No. 5C: pore size 1 μm) to separate particles and the filtrate. The obtained particles are further washed with 100 parts by mass of deionized water and subjected to vacuum drying at 25° C. for 24 hours to prepare a powder for measuring the number percentage Ca or Cb of toner particles having a cohesion cluster.

For the obtained powder, Ca and Cb are calculated by the same procedure as the "method of calculating number percentage CI of toner particles having cohesion cluster", and whether the relationships of formulae (1) and (2) below are satisfied is checked.

$$0.90 \leq Ca/CI \leq 1.00 \quad \text{Formula (1)}$$

$$0.05 \leq Cb/CI \leq 0.25 \quad \text{Formula (2)}$$

Asker C Hardness of Developing Roller

The Asker C hardness can be measured using a type C durometer (Asker Type C spring rubber hardness meter, manufactured by KOBUNSHI KEIKI CO., LTD.) described in JIS K 7312-1996 under an environment of a temperature of 23° C. and a relative humidity of 55%. The value obtained two seconds after the durometer is brought into contact with a developing roller that has been left to stand under the environment of a temperature of 23° C. and a relative humidity of 55% for 12 hours or more with a force of 10 N is used as the measured value. The measurement positions are 9 positions in total: for each of three positions, namely, a central position of the developing roller in the longitudinal direction and positions at 90 mm from the central position toward both ends, three positions in the circumferential direction (at 120° intervals). The arithmetic mean value of the measured values at these nine positions is determined as the Asker C hardness.

EXAMPLES

Hereinafter, specific Examples and Comparative Examples of the process cartridge according to the present disclosure will be described. However, the present disclosure is not limited to the configurations described in Examples. In the following production examples and Examples, the unit "part" is on a mass basis unless otherwise specified.

Preparation of Resin Particle Dispersion Liquid 1

First, 78.0 parts of styrene, 20.7 parts of butyl acrylate, 1.3 parts of acrylic acid serving as a monomer that provides a carboxyl group, and 3.2 parts of n-lauryl mercaptan were mixed together to prepare a solution. To the solution, the whole amount of aqueous solution prepared by dissolving 2.0 parts of a linear sodium alkylbenzene sulfonate (product name: Neogen RK (manufactured by DKS Co. Ltd.) in 150 parts of deionized water was added and dispersed.

An aqueous solution of 0.3 parts of potassium persulfate in 10 parts of deionized water was added to the resulting mixture while the mixture was further slowly stirred for 10 minutes. After the system was purged with nitrogen, the mixture was subjected to emulsion polymerization at 70° C. for six hours. After completion of the polymerization, the reaction mixture was cooled to room temperature, and deionized water was added thereto. Thus, a resin particle dispersion liquid 1 having a solid content of 12.5% by mass and a median diameter of 0.2 μm on a volume basis was prepared.

Preparation of Release Agent Dispersion Liquid 1

First, 100 parts of a release agent (behenyl behenate, melting point: 72.1° C.) and 15 parts of an aliphatic alcohol alkylene oxide adduct were mixed with 385 parts of deionized water. The mixture was dispersed for about one hour with a wet jet mill JN 100 (manufactured by JOKOH CO., LTD.) to prepare a release agent dispersion liquid 1. The concentration of the release agent dispersion liquid 1 was 20% by mass.

Preparation of Coloring Agent Dispersion Liquid 1

First, 100 parts of carbon black "Nipex 35, (manufactured by Orion Engineered Carbons)" serving as a coloring agent and 15 parts of an aliphatic alcohol alkylene oxide adduct were mixed with 885 parts of deionized water. The mixture was dispersed for about one hour with a wet jet mill JN 100 to prepare a coloring agent dispersion liquid 1.

Preparation of Toner Core Particle Dispersion Liquid 1

Dispersion Step

First, 265 parts of the resin particle dispersion liquid 1, 10 parts of the release agent dispersion liquid 1, 10 parts of the coloring agent dispersion liquid 1, 2.9 parts of an aliphatic alcohol alkylene oxide adduct, and 0.6 parts of a linear sodium alkylbenzene sulfonate (Neogen RK) were dispersed with a homogenizer (ULTRA-TURRAX T50, manufactured by IKA). The temperature in the vessel was adjusted to 30° C. under stirring, and a 1 mol/L aqueous sodium hydroxide solution was added to the mixture to adjust the pH to 8.0.

Aggregation Step

An aqueous solution prepared by dissolving 0.08 parts of aluminum chloride serving as an aggregating agent in 10 parts of deionized water was added to the mixture over a period of 10 minutes at 30° C. under stirring. After the resulting mixture was left to stand for three minutes, a temperature rise was started. The mixture was heated to 50° C. to form associated particles. In that state, the particle diameter of the associated particles was measured with a "Multisizer 3 Coulter Counter" (registered trademark, manufactured by Beckman Coulter, Inc.). When the weight-average particle diameter was 7.0 μm, 0.9 parts of sodium chloride and 5.0 parts of an aliphatic alcohol were added thereto to terminate the particle growth.

A 1 mol/L aqueous sodium hydroxide solution was added to the mixture to adjust the pH to 9.0, and the mixture was then heated to 95° C. to spheroidize aggregate particles. When the average circularity reached 0.980, a temperature drop was started. The mixture was cooled to room temperature to prepare a toner core particle dispersion liquid 1.

Preparation of Monomer Dispersion Liquid 1 Having Silica and Binder Component

First, 100 parts of styrene, 20 parts of methacryloxypropyltrimethoxysilane, and 100 parts of colloidal silica were dispersed with a homogenizer (ULTRA-TURRAX T50, manufactured by IKA). The temperature in the vessel was adjusted to 25° C., and stirring was performed for one hour to prepare a monomer dispersion liquid 1 having silica and a binder component.

Preparation of Monomer Dispersion Liquids 2 to 8 Having Silica and Binder Component Monomer dispersion liquids 2 to 8 having silica and a binder component were prepared as in the preparation of the monomer dispersion liquid 1 having silica and a binder component except that the amounts (parts) and the type of material were changed as described in Table 1.

TABLE 1

| | Binder component | | | | Silica | | |
|---|---|---|---|---|---|---|---|
| | Monomer A | Amount added in dispersion step [parts] | Monomer B | Amount added in dispersion step [parts] | Type | Particle diameter [nm] | Amount added in dispersion step [parts] |
| Monomer dispersion liquid 1 | Styrene | 100 | Methacryloxypropyltrimethoxysilane | 20 | Colloidal silica | 105 | 100 |
| Monomer dispersion liquid 2 | Styrene | 25 | Methacryloxypropyltrimethoxysilane | 15 | Colloidal silica | 35 | 100 |
| Monomer dispersion liquid 3 | Styrene | 100 | Methacryloxypropyltrimethoxysilane | 20 | Fumed silica | 35 | 100 |
| Monomer dispersion liquid 4 | Styrene | 100 | Methacryloxypropyltrimethoxysilane | 10 | Colloidal silica | 105 | 100 |
| Monomer dispersion liquid 5 | Styrene | 100 | Methacryloxypropyltrimethoxysilane | 28 | Colloidal silica | 105 | 100 |
| Monomer dispersion liquid 6 | Styrene | 20 | Methacryloxypropyltrimethoxysilane | 10 | Fumed silica | 35 | 110 |
| Monomer dispersion liquid 7 | Styrene | 120 | Methacryloxypropyltrimethoxysilane | 0 | Colloidal silica | 105 | 100 |
| Monomer dispersion liquid 8 | Styrene | 100 | Methacryloxypropyltrimethoxysilane | 35 | Colloidal silica | 105 | 100 |

Production of toner 1

To 100 parts of the toner core particle dispersion liquid 1, 2.75 parts of the monomer dispersion liquid 1 prepared by the method described above and 0.005 parts of potassium persulfate were added, the temperature in a vessel was adjusted to 90° C., and the mixture was stirred with a Fullzone stirring blade for two hours to prepare a toner-particle dispersion liquid 1.

Hydrochloric acid was added to the toner-particle dispersion liquid 1 to adjust the pH to 1.5 or less. The mixture was stirred for one hour, left to stand, and subjected to solid-liquid separation with a pressure filter to prepare a toner cake. The toner cake was reslurried with deionized water to prepare a dispersion liquid again, and the dispersion liquid was then subjected to solid-liquid separation with the above filter. After the reslurrying and the solid-liquid separation were repeated until the filtrate had an electrical conductivity of 5.0 μS/cm or less, final solid-liquid separation was performed to prepare a toner cake. The resulting toner cake was dried and further classified with a classifier to prepare toner particles 1. The toner particles 1 had a weight-average particle diameter of 6.9 μm.

Next, 100 parts of the toner particles 1 and 0.4 parts of hydrotalcite "DHT-4A (manufactured by Kyowa Chemical Industry Co., Ltd.)" were put into an FM mixer (Model FM10C, manufactured by Nippon Coke & Engineering Co., Ltd.) in which water at 7° C. was passed through a jacket. After the water temperature in the jacket was stabilized at 7° C.±1° C., mixing was performed at a peripheral speed of a rotation impeller of 38 m/sec for five minutes to prepare a toner mixture 1. At this time, the water flow rate in the jacket was appropriately adjusted such that the temperature in the vessel of the FM mixer did not exceed 25° C. The resulting toner mixture 1 was sieved through a mesh with a sieve opening of 75 μm to obtain a toner 1.

The values of CI, Ca, Cb, and Ag of the toner 1 were measured. These physical properties are shown in Tables 2-1 and 2-2.

Production of Toners 2 to 7 and 9 to 13

Toners 2 to 7 and 9 to 13 were obtained as in the production of the toner 1 except that the monomer dispersion liquid used was changed as shown in Table 2-1. The physical properties of the toners 2 to 7 and 9 to 13 are shown in Tables 2-1 and 2-2.

Production of Toner 8

The toner particles 1 prepared in the production of the toner 1 were used as a toner 8 as they were without being subjected to the external addition treatment of hydrotalcite. The physical properties of the toner 8 are shown in Tables 2-1 and 2-2.

TABLE 2-1

| | | Monomer dispersion liquid having fine silica particles and binder component | | Additive | | External additive | |
|---|---|---|---|---|---|---|---|
| | Toner particles | Type | Amount [parts] | Type | Amount [parts] | Type | Amount [parts] |
| Toner 1 | Toner particles 1 | Monomer dispersion liquid 1 | 2.75 | Potassium persulfate | 0.005 | Hydrotalcite | 0.4 |
| Toner 2 | Toner particles 1 | Monomer dispersion liquid 1 | 0.50 | Potassium persulfate | 0.001 | Hydrotalcite | 0.4 |
| Toner 3 | Toner particles 1 | Monomer dispersion liquid 1 | 6.50 | Potassium persulfate | 0.012 | Hydrotalcite | 0.4 |
| Toner 4 | Toner particles 1 | Monomer dispersion liquid 2 | 1.50 | Potassium persulfate | 0.003 | Hydrotalcite | 0.4 |
| Toner 5 | Toner particles 1 | Monomer dispersion liquid 3 | 5.00 | Potassium persulfate | 0.012 | Hydrotalcite | 0.4 |
| Toner 6 | Toner particles 1 | Monomer dispersion liquid 4 | 2.90 | Potassium persulfate | 0.005 | Hydrotalcite | 0.4 |

TABLE 2-1-continued

| | Toner particles | Monomer dispersion liquid having fine silica particles and binder component Type | Amount [parts] | Additive Type | Amount [parts] | External additive Type | Amount [parts] |
|---|---|---|---|---|---|---|---|
| Toner 7 | Toner particles 1 | Monomer dispersion liquid 5 | 2.60 | Potassium persulfate | 0.005 | Hydrotalcite | 0.4 |
| Toner 8 | Toner particles 1 | Monomer dispersion liquid 1 | 2.75 | Potassium persulfate | 0.005 | — | — |
| Toner 9 | Toner particles 1 | Monomer dispersion liquid 1 | 0.45 | Potassium persulfate | 0.001 | Hydrotalcite | 0.4 |
| Toner 10 | Toner particles 1 | Monomer dispersion liquid 1 | 7.00 | Potassium persulfate | 0.013 | Hydrotalcite | 0.4 |
| Toner 11 | Toner particles 1 | Monomer dispersion liquid 6 | 1.50 | Potassium persulfate | 0.003 | Hydrotalcite | 0.4 |
| Toner 12 | Toner particles 1 | Monomer dispersion liquid 7 | 2.75 | Potassium persulfate | 0.004 | Hydrotalcite | 0.4 |
| Toner 13 | Toner particles 1 | Monomer dispersion liquid 8 | 2.75 | Potassium persulfate | 0.007 | Hydrotalcite | 0.4 |

TABLE 2-2

| | CI [number %] | Ca [number %] | Cb [number %] | Ca/CI | Cb/CI | Ag [nm] |
|---|---|---|---|---|---|---|
| Toner 1 | 6.4 | 6.3 | 0.7 | 0.99 | 0.11 | 4120 |
| Toner 2 | 1.0 | 1.0 | 0.1 | 0.99 | 0.14 | 2680 |
| Toner 3 | 15.0 | 14.3 | 1.4 | 0.95 | 0.09 | 7210 |
| Toner 4 | 2.8 | 2.7 | 0.2 | 0.95 | 0.07 | 500 |
| Toner 5 | 10.1 | 9.6 | 0.6 | 0.95 | 0.06 | 7850 |
| Toner 6 | 8.9 | 8.0 | 0.4 | 0.90 | 0.05 | 3820 |
| Toner 7 | 6.1 | 6.1 | 1.5 | 1.00 | 0.25 | 3930 |
| Toner 8 | 6.4 | 6.3 | 0.7 | 0.99 | 0.11 | 4070 |
| Toner 9 | 0.7 | 0.7 | 0.1 | 0.99 | 0.13 | 1330 |
| Toner 10 | 16.0 | 15.5 | 1.4 | 0.97 | 0.09 | 7480 |
| Toner 11 | 2.5 | 2.4 | 0.2 | 0.95 | 0.06 | 490 |
| Toner 12 | 7.1 | 6.2 | 0.3 | 0.87 | 0.04 | 4120 |
| Toner 13 | 6.0 | 6.0 | 1.5 | 1.00 | 0.26 | 4120 |

Preparation of developing roller 1

Formation of Elastic Layer

A conductive shaft member was prepared by applying a primer (trade name "DY39-012"; manufactured by DuPont Toray Specialty Materials K.K.) to a stainless steel (SUS304) metal core having a diameter of 6 mm so as to have a thickness of 10 μm, and charging the metal core in a hot air vulcanization furnace at 150° C. for 15 minutes to perform baking. The conductive shaft member was placed in a die, and an addition-type silicone rubber composition prepared by mixing the materials shown in "Elastic roller 1" of Table 3 below was poured into a cavity formed in the die.

TABLE 3

| | Polydimethylsiloxane terminated at both ends with vinyl groups Type | Amount [parts] | Methylhydrogen polysiloxane Type | Amount [parts] | Platinum catalyst Type | Amount [parts] | Curing retarder Type | Amount [parts] | Carbon black Type | Amount [parts] |
|---|---|---|---|---|---|---|---|---|---|---|
| Elastic roller 1 | DMS-V42 | 100 | HMS-301 | 10 | SIP6830.3 | 0.1 | 1-Ethynyl-1-cyclohexanol | 0.05 | DENKA BLACK powder product | 5.0 |
| Elastic roller 2 | DMS-V46 | 100 | HMS-151 | 2 | SIP6830.3 | 0.1 | 1-Ethynyl-1-cyclohexanol | 0.05 | DENKA BLACK powder product | 5.0 |
| Elastic roller 3 | DMS-V35 | 100 | HMS-301 | 15 | SIP6830.3 | 0.1 | 1-Ethynyl-1-cyclohexanol | 0.05 | DENKA BLACK powder product | 5.0 |
| Elastic roller 8 | DMS-V35 | 100 | HMS-301 | 15 | SIP6830.3 | 0.1 | 1-Ethynyl-1-cyclohexanol | 0.05 | DENKA BLACK powder product | 5.5 |

Subsequently, the die was heated at a temperature of 130° C. for five minutes to cure the addition-type silicone rubber composition, and the resulting cured product was released from the die. Subsequently, heating was performed at a temperature of 180° C. for one hour to complete the curing reaction of the silicone rubber layer. Thus, an elastic roller 1 in which an elastic layer with a thickness of 3 mm was provided on the outer periphery of the shaft member was prepared.

Formation of Surface Layer

The following materials were mixed, and methyl ethyl ketone was added such that the total solid content ratio became 30% by mass, and mixing was then performed with a sand mill.

Polytetramethylene ether glycol (trade name: PTMG2000; manufactured by Mitsubishi Chemical Corporation) 100.0 parts Polymeric MDI (trade name: Millionate MR-200; manufactured by Tosoh Corporation) 20.0 parts Carbon black (trade name: MA100; manufactured by Mitsubishi Chemical Corporation) 30.0 parts Fine urethane resin particles (trade name: ART PEARL C-400; manufactured by Kao Corporation) 1.0 part Polyether-modified silicone oil (trade name: TSF4445; manufactured by Momentive Performance Materials Inc.) 1.0 part Subsequently, methyl ethyl ketone was added to the mixture to adjust the viscosity to 10 to 12 cps (mPa·s). Thus, a coating liquid was prepared.

The coating liquid was applied to the elastic roller 1 by a dipping method so as to have a film thickness of 15 μm. In the dipping method, an upper end portion of the conductive shaft member was gripped and dipped in the coating liquid with the longitudinal direction of the elastic roller 1 being directed in the vertical direction. The resulting coated product was dried at room temperature (23° C.) for 30 minutes and then subjected to a curing reaction in an oven at a temperature of 150° C. for two hours to prepare a developing roller 1 having a surface layer on the outer peripheral surface of the elastic layer.

Measurement of Asker C Hardness

The Asker C hardness of the developing roller 1 was measured using a type C durometer (Asker Type C spring rubber hardness meter, manufactured by KOBUNSHI KEIKI CO., LTD.) described in JIS K 7312-1996 under an environment of a temperature of 23° C. and a relative humidity of 55%. The value obtained two seconds after the durometer was brought into contact with the developing roller 1 that had been left to stand under the environment of a temperature of 23° C. and a relative humidity of 55% for 12 hours or more with a force of 10 N was used as the measured value. The measurement positions were 9 positions in total: for each of three positions, namely, a central position of the developing roller in the longitudinal direction and positions at 90 mm from the central position toward both ends, three positions in the circumferential direction (at 120° intervals). The arithmetic mean value of the measured values at these nine positions was determined as the Asker C hardness. The developing roller 1 had an Asker C hardness of 65 degrees.

Preparation of Developing Rollers 2 and 3

Developing rollers 2 and 3 were prepared as in the developing roller 1 except that the materials of the addition-type silicone rubber used for forming the elastic layer were changed to the materials shown in the "Elastic roller 2" and "Elastic roller 3" of Table 3. The developing roller 2 had an Asker C hardness of 56 degrees, and the developing roller 3 had an Asker C hardness of 75 degrees.

Preparation of Developing Roller 4

A conductive shaft member was disposed in a die, and a thermosetting polyurethane resin composition prepared by mixing the following materials was poured into a cavity formed in the die.

Polypropylene glycol (trade name: EXCENOL 3020; manufactured by AGC Inc.) 100.0 parts Isocyanate compound (trade name: TAKENATE 500; manufactured by Mitsui Chemicals, Inc.) 12.0 parts Carbon black (trade name: MA100; manufactured by Mitsubishi Chemical Corporation) 30.0 parts Subsequently, the die was heated at a temperature of 120° C. for 30 minutes to cure the thermosetting polyurethane resin composition and the resulting cured product was released from the die. Subsequently, aging was further performed at room temperature for 24 hours. Thus, an elastic roller 4 in which an elastic layer with a thickness of 3 mm was provided on the outer periphery of the shaft member was prepared.

The resulting elastic roller 4 was subjected to the same procedure as the procedure of forming a surface layer of the developing roller 1 to prepare a developing roller 4. The developing roller 4 had an Asker C hardness of 70 degrees.

Preparation of Developing Roller 5

An elastic roller 5 was prepared by the same procedure as the above-described procedure of preparing the elastic roller 4.

Formation of Surface Layer

The materials whose types and amounts are described below were mixed using a pressure kneader to prepare an A-kneaded rubber composition.

NBR (trade name: Nipol DN219; manufactured by Zeon Corporation) 100.0 parts

Carbon black (trade name: TOKABLACK #4300; manufactured by Tokai Carbon Co., Ltd.) 40.0 parts Calcium carbonate (trade name: NANOX #30; manufactured by Maruo Calcium Co., Ltd.) 20.0 parts Stearic acid (trade name: Stearic acid S; manufactured by Kao Corporation) 1.0 part Furthermore, the following materials were mixed with the A-kneaded rubber composition using an open-roll mill to prepare an unvulcanized rubber composition.

Sulfur (trade name: Sulfax 200S; manufactured by Tsurumi Chemical Industry Co., Ltd.) 1.2 parts Tetrabenzylthiuram disulfide (trade name: TBZTD; manufactured by Sanshin Chemical Industry Co., Ltd.) 4.5 parts The unvulcanized rubber composition was formed into a sheet. The sheet was wrapped around the outer peripheral surface of the elastic roller 5 prepared in advance, placed in a press mold with an inner diameter of 13 mm, formed by pressing at 160° C. for one hour so that the sheet was crosslinked and integrated with the elastic roller 5. The resulting roller was further cooled, then polished such that the outer diameter of the roller was 12.1 mm to form a surface layer. Thus, a developing roller 5 was prepared. The developing roller 5 had an Asker C hardness of 72 degrees.

Preparation of Developing Roller 6

The following materials were mixed using a pressure kneader to prepare an A-kneaded rubber composition.

NBR rubber (trade name: Nipol DN219; manufactured by Zeon Corporation) 100.0 parts Carbon black (trade name: TOKABLACK #4300; manufactured by Tokai Carbon Co., Ltd.) 40.0 parts Calcium carbonate (trade name: NANOX #30; manufactured by Maruo Calcium Co., Ltd.) 20.0 parts Stearic acid (trade name: Stearic acid S; manufactured by Kao Corporation) 1.0 part Furthermore, the following materials were mixed with the A-kneaded rubber composition using an open-roll mill to prepare an unvulcanized rubber composition.

Sulfur (trade name: Sulfax 200S; manufactured by Tsurumi Chemical Industry Co., Ltd.) 1.2 Parts Tetrabenzylthiuram Disulfide (trade name: TBZTD; manufactured by Sanshin Chemical Industry Co., Ltd.) 4.5 parts A cross-head extruder having a conductive shaft member-supplying mechanism and an unvulcanized rubber roller-discharging mechanism was prepared. A die having an inner diameter of 16.5 mm was attached to the cross head. The temperatures of the extruder and the cross head were adjusted to 80° C., and the conveying speed of a conductive shaft member was adjusted to 60 mm/sec. A stainless steel (SUS304) metal core having a diameter of 6 mm was prepared as the conductive shaft member. Under these conditions, the unvulcanized rubber composition was supplied from the extruder, and the conductive shaft member was covered with the unvulcanized rubber composition serving as an elastic layer in the cross head to provide an unvulcanized rubber roller. Next, the unvulcanized rubber roller was charged in a hot air vulcanization furnace at 170° C. and was heated for 60 minutes to provide an unpolished conductive roller. Subsequently, ends of the elastic layer were cut and removed, and the surface of the elastic layer was polished with a rotary grindstone. Thus, an elastic roller 6 in which an elastic layer with a thickness of 3 mm was provided on the outer periphery of the shaft member was prepared.

The resulting elastic roller 6 was subjected to the same procedure as the procedure of forming a surface layer of the developing roller 1 to prepare a developing roller 6. The developing roller 6 had an Asker C hardness of 75 degrees.

Preparation of Developing Roller 7

An elastic roller 7 in which an elastic layer with a thickness of 3 mm was provided on the outer periphery of a shaft member was prepared by the same preparation procedure as that for the elastic roller 4. The elastic roller 7 was used as a developing roller 7 as it was without providing a surface layer. The developing roller 7 had an Asker C hardness of 70 degrees.

Preparation of Developing Roller 8

An elastic roller 8 was prepared in which the materials of the addition-type silicone rubber used for forming the elastic layer were changed to the materials shown in Table 3. A developing roller 8 was prepared as in the developing roller 1 except that the elastic roller 8 was used. The developing roller 8 had an Asker C hardness of 55 degrees.

Preparation of Developing Roller 9

A developing roller 9 was prepared as in the developing roller 6 except that the materials of the A-kneaded rubber composition were changed to the following materials.

NBR rubber (trade name: Nipol DN219; manufactured by Zeon Corporation) 100.0 parts Carbon black (trade name: TOKABLACK #4300; manufactured by Tokai Carbon Co., Ltd.) 40.0 parts Calcium carbonate (trade name: NANOX #30; manufactured by Maruo Calcium Co., Ltd.) 25.0 parts Stearic acid (trade name: Stearic acid S; manufactured by Kao Corporation) 1.0 part The developing roller 9 had an Asker C hardness of 76 degrees.

Example 1

A laser printer (trade name: HP Color Laser jet Enterprise M653dn, manufactured by HP Inc.) was prepared as an electrophotographic apparatus. A process cartridge dedicated for the electrophotographic apparatus was filled with the toner 1. The developing roller 1 prepared above was mounted as a developing roller. After the electrophotographic apparatus and the process cartridge were left to stand in each evaluation environment described below for 24 hours or more so as to be sufficiently adapted to the environment, the process cartridge was attached to the electrophotographic apparatus, and evaluation was performed. A4 color laser copy paper (manufactured by CANON KABUSHIKI KAISHA, 80 g/m$^2$) was used as evaluation paper.

Fogging Evaluation

Fogging evaluation was performed in a high-temperature, high-humidity environment at a temperature of 30° C. and a relative humidity of 80%.

First, the reflection density of evaluation paper was measured with a reflection densitometer (trade name: TC-6DS/A, manufactured by Tokyo Denshoku. Co., Ltd.) using an amberlite filter as a filter. Subsequently, a solid white image was output on the evaluation paper, and the reflection density after output was measured. The difference in reflection density between before and after image output was determined as an initial fogging value.

Subsequently, a durability test of repeatedly outputting an image in which the character "E" of the alphabet was printed with a coverage of 1% with respect to the area of the A4 paper (hereinafter, this is referred to as an "E-character image") was performed. The conditions for the durability test are that 50,000 electrophotographic images are output by repeating an intermittent image forming operation in which, after two E-character images are output, the rotation of a photosensitive drum is completely stopped for about five seconds, and image output is resumed.

After 50,000 sheets were output, a solid white image was output on evaluation paper whose reflection density had been measured in advance. The difference in reflection density between before and after image output was determined as a fogging value after the durability test.

With regard to the initial fogging value and the fogging value after the durability test, the evaluation was performed on the basis of the following criteria. The evaluation results are shown in Table 4.

Rank A: less than 1%

Rank B: 1% or more and less than 2.5%

Rank C: 2.5% or more and less than 5%

Rank D: 5% or more and less than 10%

Development Stripe Evaluation

The development stripe evaluation was performed in a low-temperature, low-humidity environment at a temperature of 15° C. and a relative humidity of 10%.

The durability test in which the E-character image was repeatedly output was performed. The conditions for the durability test are that 50,000 electrophotographic images are output by repeating an intermittent image forming operation in which, after two E-character images are output, the rotation of the photosensitive drum is completely stopped for about five seconds, and image output is resumed.

After 50,000 sheets were output, a half-tone image was output, and the generation of vertical stripes on the image was evaluated on the basis of the following criteria. The evaluation results are shown in Table 4.

Rank A: No vertical stripes were generated.

Rank B: One vertical stripe was generated.

Rank C: Two to four vertical stripes were generated.

Rank D: Five or more vertical stripes were generated.

Examples 2 to 14 and Comparative Examples 1 to 7

The evaluation was performed as in Example 1 except that the toner loaded in the process cartridge and the developing roller mounted were combined as shown in Table 4. The evaluation results are shown in Table 4.

TABLE 4

| | Toner configuration Toner No. | Developing roller configuration: Developing roller No. | Elastic layer material | Surface layer material | Asker C hardness [°] | Evaluation: Fogging evaluation | Development stripe |
|---|---|---|---|---|---|---|---|
| Example 1 | 1 | 1 | Silicone resin | Polyurethane resin | 65 | A (0.5%) | A (0) |
| Example 2 | 2 | 1 | Silicone resin | Polyurethane resin | 65 | C (2.6%) | A (0) |
| Example 3 | 3 | 1 | Silicone resin | Polyurethane resin | 65 | A (0.7%) | C (2) |
| Example 4 | 4 | 1 | Silicone resin | Polyurethane resin | 65 | B (2.2%) | A (0) |
| Example 5 | 5 | 1 | Silicone resin | Polyurethane resin | 65 | A (0.6%) | B (1) |
| Example 6 | 6 | 1 | Silicone resin | Polyurethane resin | 65 | C (3.4%) | A (0) |
| Example 7 | 7 | 1 | Silicone resin | Polyurethane resin | 65 | C (2.8%) | A (0) |
| Example 8 | 8 | 1 | Silicone resin | Polyurethane resin | 65 | C (2.6%) | A (0) |
| Example 9 | 1 | 2 | Silicone resin | Polyurethane resin | 56 | C (4.1%) | A (0) |
| Example 10 | 1 | 3 | Silicone resin | Polyurethane resin | 75 | C (4.4%) | A (0) |
| Example 11 | 1 | 4 | Polyurethane resin | Polyurethane resin | 70 | A (0.7%) | A (0) |
| Example 12 | 1 | 5 | Polyurethane resin | NBR surface layer | 72 | C (4.3%) | A (0) |
| Example 13 | 1 | 6 | NBR base layer | Polyurethane resin | 75 | C (4.9%) | A (0) |
| Example 14 | 1 | 7 | Polyurethane resin | — | 70 | B (2.3%) | A (0) |
| Comparative Example 1 | 9 | 4 | Polyurethane resin | Polyurethane resin | 70 | D (9.3%) | A (0) |
| Comparative Example 2 | 10 | 4 | Polyurethane resin | Polyurethane resin | 70 | A (0.8%) | D (5) |
| Comparative Example 3 | 11 | 4 | Polyurethane resin | Polyurethane resin | 70 | D (6.9%) | A (0) |
| Comparative Example 4 | 12 | 4 | Polyurethane resin | Polyurethane resin | 70 | D (6.1%) | A (0) |
| Comparative Example 5 | 13 | 4 | Polyurethane resin | Polyurethane resin | 70 | D (5.9%) | A (0) |
| Comparative Example 6 | 1 | 8 | Silicone resin | Polyurethane resin | 55 | D (5.3%) | A (0) |
| Comparative Example 7 | 1 | 9 | NBR base layer | Polyurethane resin | 76 | D (7.7%) | A (0) |

As shown in Table 4, it was found that use of the process cartridges according to Examples 1 to 14 could suppress the occurrence of fogging even in the case of long-term use in the high-temperature, high-humidity environment and could suppress the generation of development stripes even in the case of long-term use in the low-temperature, low-humidity environment.

By contrast, in Comparative Example 1, in which the value of CI was 0.7%, fogging suppression was deteriorated by long-term use in the high-temperature, high-humidity environment, and in Comparative Example 2, in which the value of CI was 16%, development stripe suppression was deteriorated by long-term use in the low-temperature, low-humidity environment. In Comparative Examples 3 to 5, in which any of Ag, Ca/CI, and Cb/CI did not satisfy the specified ranges of the present disclosure, fogging suppression was deteriorated by long-term use in the high-temperature, high-humidity environment. Also in Comparative Example 6, in which the Asker C hardness of the developing roller was 55 degrees, and Comparative Example 7, in which the Asker C hardness of the developing roller was 76 degrees, fogging suppression was deteriorated by long-term use in the high-temperature, high-humidity environment.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-203617, filed Dec. 1, 2023, which is hereby incorporated by reference herein in its entirety.

What is claimed is:

1. A process cartridge detachably attachable to an electrophotographic apparatus main body, the process cartridge comprising:

a toner; and a developing roller, wherein (I) the toner includes toner particles, and a cohesion cluster containing fine silica particles and a binder component is present on surfaces of the toner particles, an arithmetic mean value Ag of a Feret diameter of the cohesion cluster is 500 nm or more and 8,000 nm or less, when a number percentage of toner particles having the cohesion cluster is represented by CI (number %), CI is 1 number % or more and 15 number % or less, and when a number percentage of toner particles having the cohesion cluster in the toner after being treated under an ultrasonic wave condition A is represented by Ca (number %), and a number percentage of toner particles having the cohesion cluster in the toner after being treated under an ultrasonic wave condition B is represented by Cb (number %), CI, Ca, and Cb satisfy formulae (1) and (2), ultrasonic wave condition A: output frequency 30 kHz, output capacity 0.75 W, and irradiation time 300 s ultrasonic wave condition B: output frequency 30 kHz, output capacity 30 W, and irradiation time 300 s $$0.90 \leq Ca/CI \leq 1.00 \quad \text{Formula (1)}$$

$$0.05 \leq Cb/CI \leq 0.25, \quad \text{Formula (2)}$$

and (II) the developing roller includes a conductive shaft member and at least one elastic layer on the conductive shaft member, and the developing roller has an Asker C hardness of 56 degrees or more and 75 degrees or less.

2. The process cartridge according to claim 1, wherein the developing roller includes a conductive shaft member and an elastic layer on the conductive shaft member and further includes a surface layer covering a surface of the elastic layer.

3. The process cartridge according to claim 2, wherein the elastic layer contains a urethane resin or a silicone rubber.

4. The process cartridge according to claim 2, wherein the surface layer contains a urethane resin.

5. The process cartridge according to claim 1, wherein the toner contains a layer composite compound as an external additive.

* * * * *